(12) United States Patent
Ware et al.

(10) Patent No.: US 6,969,034 B2
(45) Date of Patent: Nov. 29, 2005

(54) ENCLOSURE BOX ATTACHMENT APPARATUS, SYSTEM, AND METHOD

(75) Inventors: Lowell J. Ware, Oskaloosa, IA (US); Thomas A. Stone, University Park, IA (US); Brett Baer, Muscatine, IA (US); Carol K. Ebeling, Muscatine, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 10/636,328

(22) Filed: Aug. 7, 2003

(65) Prior Publication Data

US 2005/0029419 A1    Feb. 10, 2005

(51) Int. Cl.[7] .............................................. A47B 96/00
(52) U.S. Cl. ................. 248/218.4; 248/230.9
(58) Field of Search ........................ 248/218.4, 219.1, 248/219.4, 230.1, 230.5, 230.8, 230.9

(56) References Cited

U.S. PATENT DOCUMENTS

| | | | |
|---|---|---|---|
| 4,374,407 A | 2/1983 | Drost et al. | |
| 5,117,779 A * | 6/1992 | Karow | 119/69.5 |
| 5,423,281 A * | 6/1995 | Crookham et al. | 116/173 |
| 5,573,211 A * | 11/1996 | Wu | 248/96 |
| 5,593,121 A * | 1/1997 | Tackett | 248/218.4 |
| 5,600,537 A | 2/1997 | Gordin et al. | |
| 6,185,303 B1 * | 2/2001 | Losey | 379/454 |
| 6,340,790 B1 | 1/2002 | Gordin et al. | |
| 6,486,399 B1 * | 11/2002 | Armstrong et al. | 174/58 |
| 6,550,170 B1 * | 4/2003 | Cooper et al. | 248/218.4 |
| 6,588,440 B2 * | 7/2003 | Varnado | 135/120.1 |
| 6,726,163 B2 * | 4/2004 | Eppard et al. | 248/219.4 |

* cited by examiner

*Primary Examiner*—Ramon O Ramirez
(74) *Attorney, Agent, or Firm*—McKee, Voorhees & Sease, P.L.C.

(57) ABSTRACT

An apparatus, system, and method for mounting enclosure boxes along a pole includes a receiver bracket independently cinchable along the side of a pole and including a receiver adapted to receive structure of an enclosure box. Once aspect of the invention includes the receiver bracket comprising a structure to receive a bar or other elongated component from the side and then allow the bar to drop and be captured. Another aspect of the invention includes a system for mounting enclosure boxes whereby independently cinchable brackets can be cinched to poles and a variety of sizes of enclosure boxes independently mounted to the receiver brackets.

34 Claims, 23 Drawing Sheets

POLE Ø ≤ 11"

POLE ∅ > 11"    POLE ∅ ≤ 11"

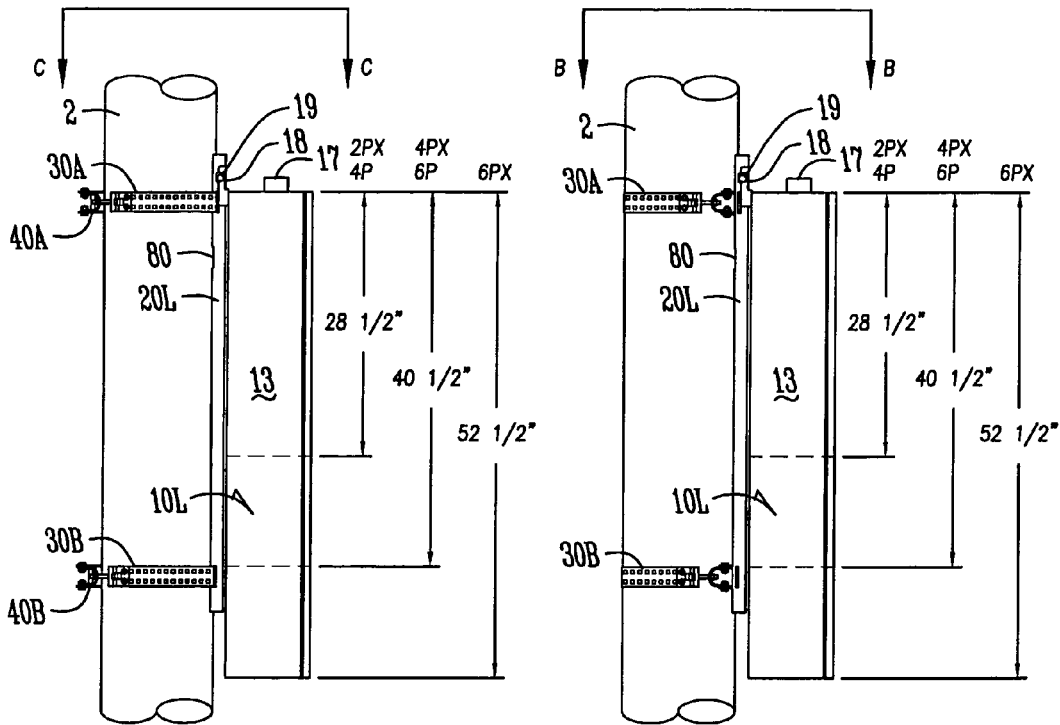
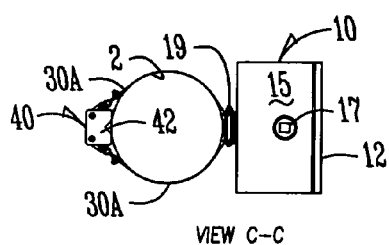
POLE Ø > 11"
REMOTE ELECTRICAL
COMPONENTS ENCLOSURE
DIMENSIONS
*Fig. 4A*
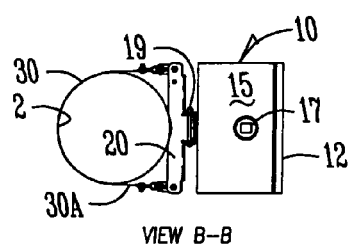
POLE Ø ≤ 11"
REMOTE ELECTRICAL
COMPONENTS ENCLOSURE
DIMENSIONS
*Fig. 5A*
VIEW C-C
*Fig. 4B*
VIEW B-B
*Fig. 5B*

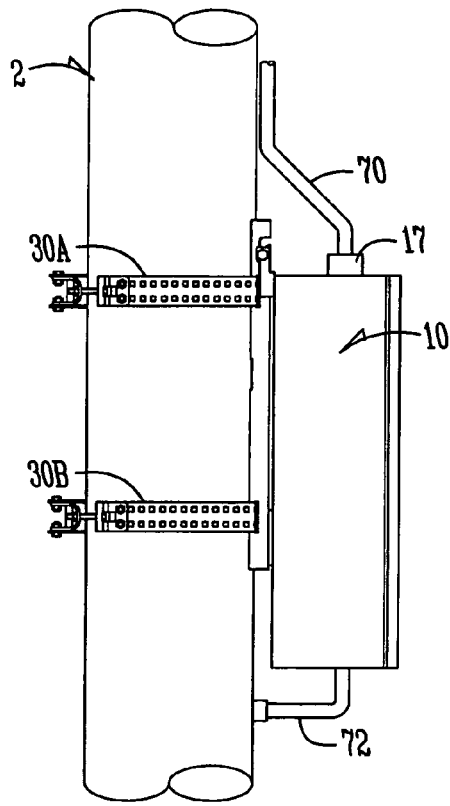 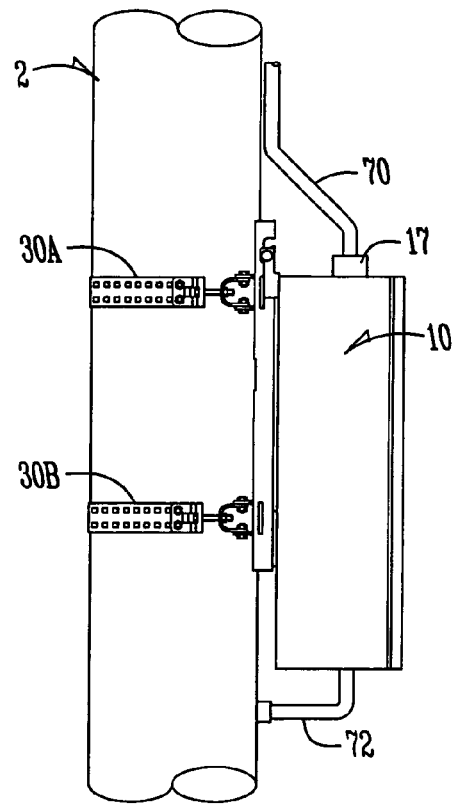
POLE ∅ > 11"
RECOMMENDED WIRING OF ENCLOSURE
POLE ∅ ≤ 11"
RECOMMENDED WIRING OF ENCLOSURE
Fig. 6A
Fig. 6B

SQUARE POLES

SINGLE STACK BOXES
POLE DIAMETERS 11" AND UP

ROUND POLES

SINGLE STACK BOXES
POLE DIAMETERS 11" AND UP

BACK TO BACK BOXES
POLE DIAMETERS 11" AND UP

BACK TO BACK BOXES
POLE DIAMETERS 11" AND UP

SINGLE STACK BOXES
POLE DIAMETERS UNDER 11"

SINGLE STACK BOXES
POLE DIAMETERS UNDER 11"

BACK TO BACK BOXES
POLE DIAMETERS UNDER 11"

BACK TO BACK BOXES
POLE DIAMETERS UNDER 11"

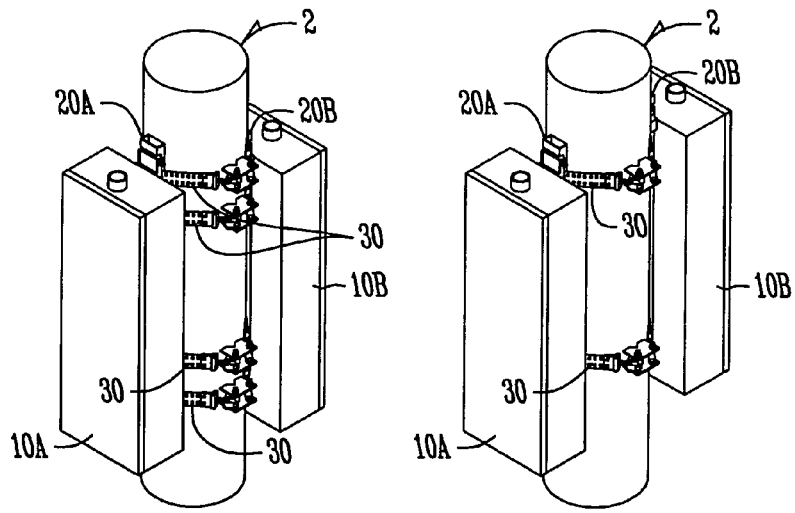
POLE DIAMETERS OVER 11"  POLE DIAMETERS OVER 11"
*Fig. 9A*   *Fig. 9B*
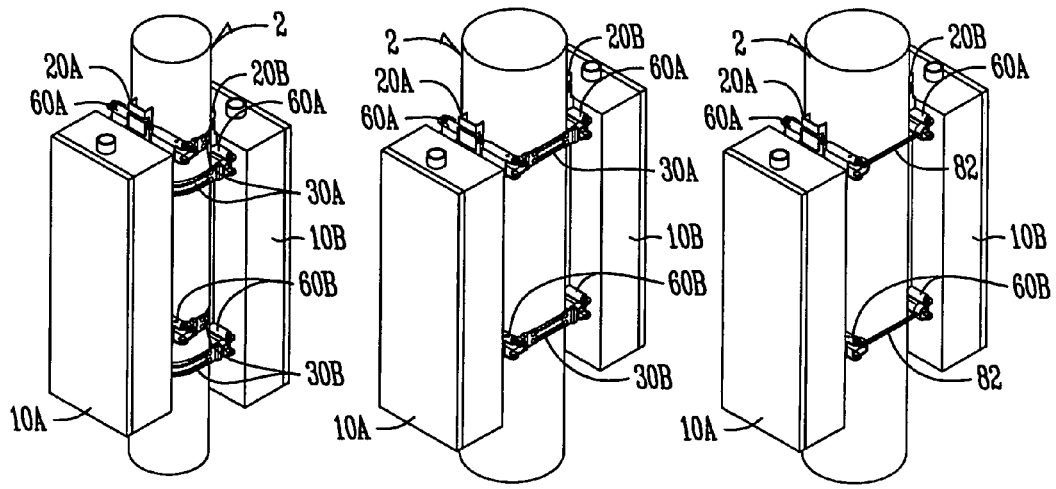
POLE DIAMETERS UNDER 11"   POLE DIAMETERS UNDER 11"   POLE DIAMETERS UNDER 11"
*Fig. 10A*   *Fig. 10B*   *Fig. 10C*

NOTE:
1. REMOVE ALL BURRS. BREAK ALL EDGES AND SHARP CORNERS .01 MIN.
2. PARTS TO BE CLEAN AND FREE OF OIL, GREASE AND DIRT.

NOTE:
1. REMOVE ALL BURRS. BREAK ALL EDGES AND SHARP CORNERS .01 MIN.
2. PARTS TO BE CLEAN AND FREE OF OIL, GREASE AND DIRT.

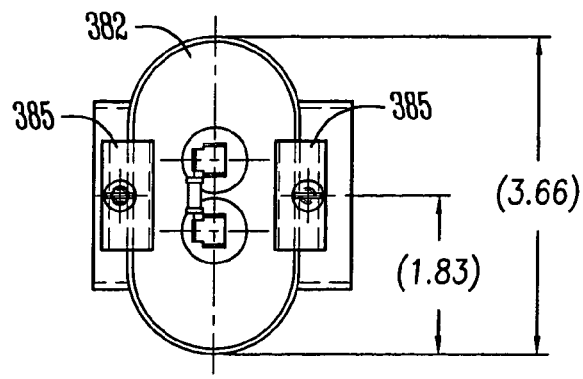
*Fig. 12E*
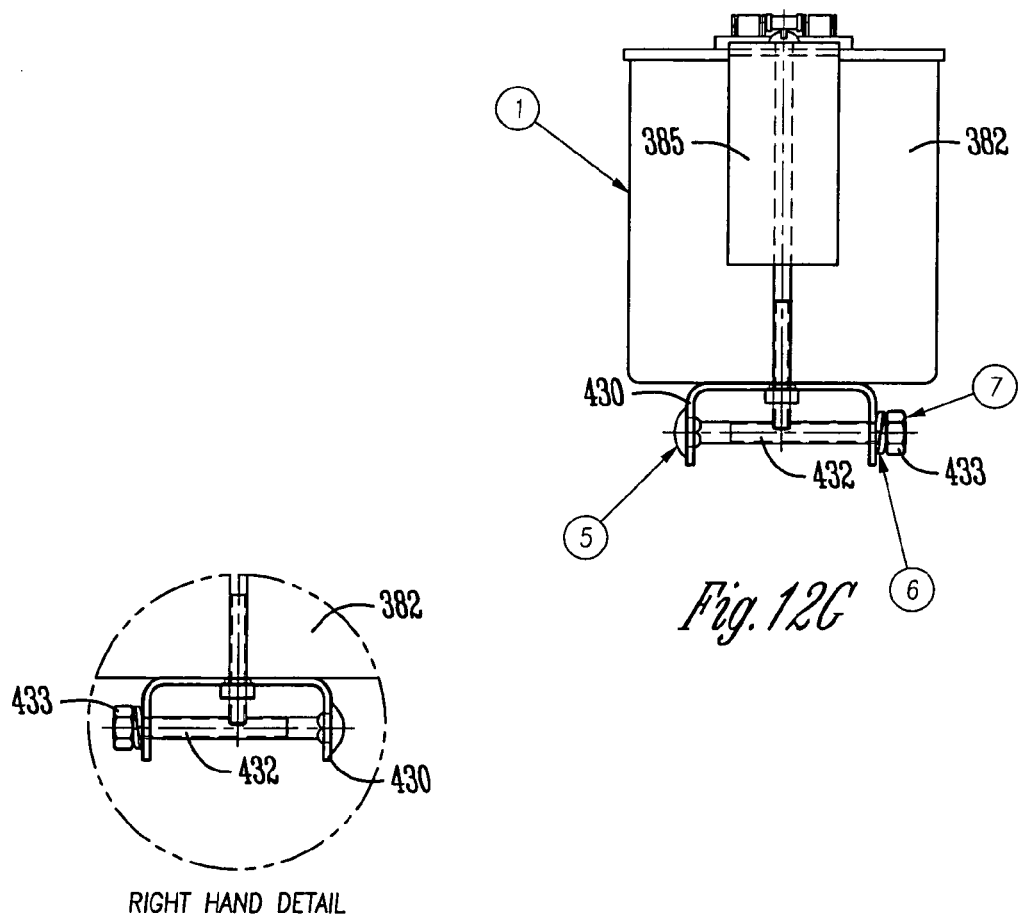
*Fig. 12G*
RIGHT HAND DETAIL
*Fig. 12H*

| BILL OF MATERIALS PER UNIT |||| 
|---|---|---|---|
| ITEM | QTY | DESCRIPTION | PART # |
| 1 | 1 | CAPACITOR | SEE CHART |
| 2 | 1 | 1-CAP MOUNTING PLATE ASSEMBLY | LS-1439 |
| 3 | 2 | #10-24 X 4.50 SL RH MACH. SCREW | LS-212 |
| 4 | 2 | LARGE CLAMP-CAP | LS-200 |
| 5 | 1 | 1/4-20 CARRIAGE BOLT | LS-209 |
| 6 | 1 | 1/4" HELICAL SPRING LOCKWASHER | LS-343 |
| 7 | 1 | 1/4-20 HEX NUT | LS-342 |

| P/N | ITEM #1 | LH/RH |
|---|---|---|
| LS-1436-1 | CAP-24 | LH |
| LS-1436-2 | CAP-24 | RH |
| LS-1436-3 | CAP-32 | LH |
| LS-1436-4 | CAP-32 | RH |

NOTE:
1. LEFT HAND VERSION SHOWN, SEE DETAIL FOR RIGHT HAND VERSION.

RIGHT HAND DETAIL

| BILL OF MATERIALS PER UNIT ||||
|---|---|---|---|
| ITEM | QTY | DESCRIPTION | PART # |
| 1 | 2 | CAPACITOR | SEE CHART |
| 2 | 1 | 2-CAP MOUNTING PLATE ASSEMBLY | LS-1440 |
| 3 | 3 | #10-24 X 4.50 SL RH MACH. SCREW | LS-212 |
| 4 | 2 | LARGE CLAMP-CAP | LS-200 |
| 5 | 1 | SMALL CLAMP-CAP | LS-201 |
| 6 | 1 | 1/4-20 CARRIAGE BOLT | LS-209 |
| 7 | 1 | 1/4" HELICAL SPRING LOCKWASHER | LS-343 |
| 8 | 1 | 1/4-20 HEX NUT | LS-342 |

|   | P/N | ITEM #1 | RH/LH |
|---|---|---|---|
|   | LS-1437-1 | CAP-24 | LH |
|   | LS-1437-2 | CAP-24 | RH |
| Ⓐ | LS-1437-3 | CAP-32 | LH |
| Ⓐ | LS-1437-4 | CAP-32 | RH |

NOTE:
1. LEFT HAND VERSION SHOWN, SEE DETAIL FOR RIGHT HAND VERSION.

RIGHT HAND DETAIL

| BILL OF MATERIALS PER UNIT ||||
|---|---|---|---|
| ITEM | QTY | DESCRIPTION | PART # |
| 1 | 3 | CAPACITOR | SEE CHART |
| 2 | 1 | 3-CAP MOUNTING PLATE ASSEMBLY | LS-1441 |
| 3 | 4 | #10-24 X 4.50 SL RH MACH. SCREW | LS-212 |
| 4 | 2 | LARGE CLAMP-CAP | LS-200 |
| 5 | 2 | SMALL CLAMP-CAP | LS-201 |
| 6 | 1 | 1/4-20 CARRIAGE BOLT | LS-209 |
| 7 | 1 | 1/4" HELICAL SPRING LOCKWASHER | LS-343 |
| 8 | 1 | 1/4-20 HEXNUT | LS-342 |

| P/N | ITEM #1 | RH/LH |
|---|---|---|
| LS-1438-1 | CAP-24 | LH |
| LS-1438-2 | CAP-24 | RH |
| LS-1438-3 | CAP-32 | LH |
| LS-1438-4 | CAP-32 | RH |

NOTE:
1. LEFT HAND VERSION SHOWN, SEE DETAIL FOR RIGHT HAND VERSION.

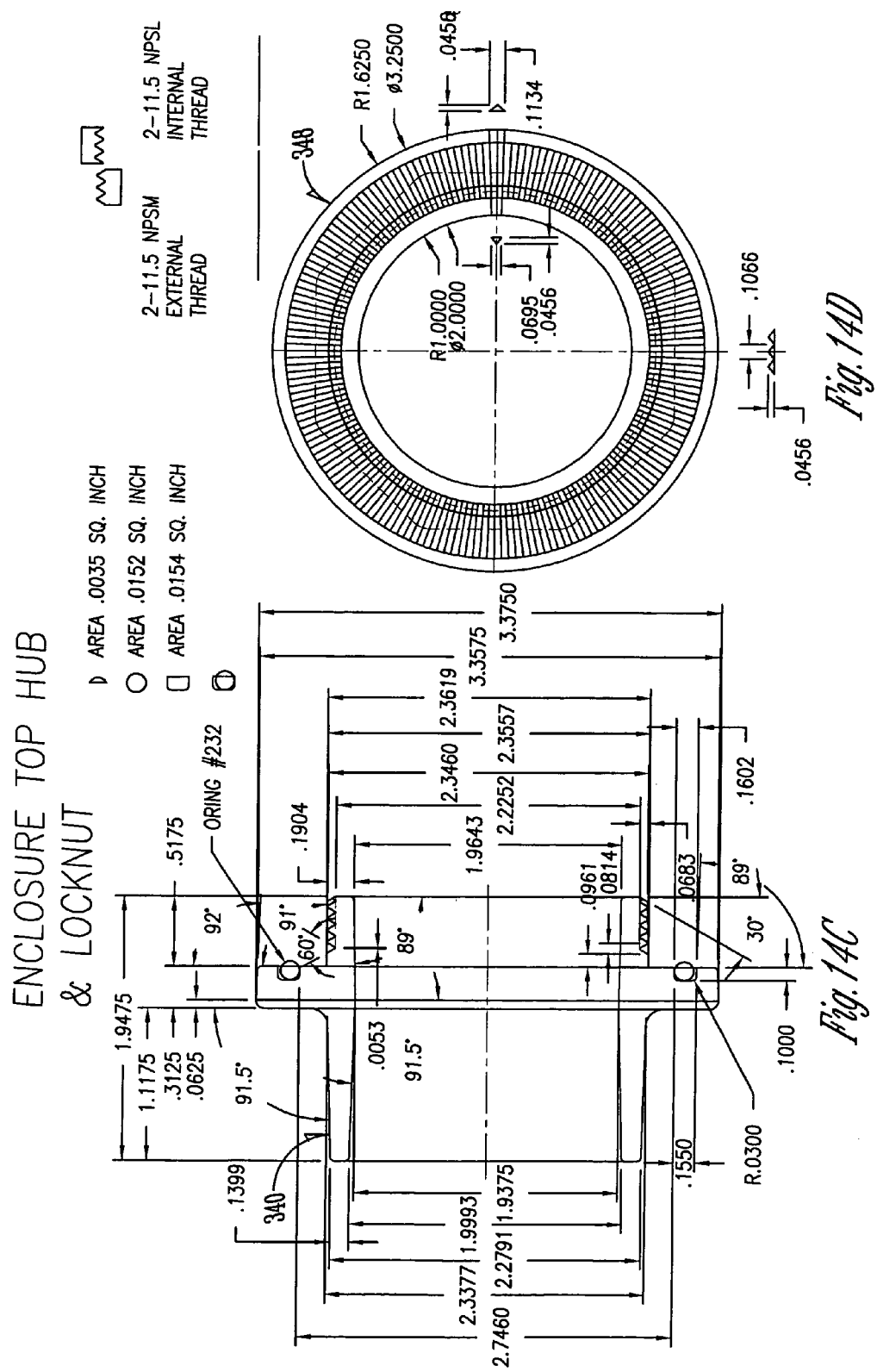

ENCLOSURE BOX ATTACHMENT APPARATUS, SYSTEM, AND METHOD

I. BACKGROUND OF THE INVENTION

A. Field of the Invention

The present invention relates to ways to attach enclosure boxes along the side of a substantially tall pole.

B. Problems in the Art

Relatively large poles erected to elevate things (e.g. lights, power lines, signs) many times also need enclosure boxes mounted along their side. Such enclosure boxes can house electrical components (e.g. ballasts, switching mechanisms, capacitors, and controllers). Sometimes it is desirable to mount more than one box along a single pole.

Just as there is a wide variety of pole diameters, shapes, and materials, likewise there is a large variety of sizes, shapes, and weights of enclosure boxes (and what they enclose) for poles.

While there are virtually an unlimited number of ways to hang or attach enclosure boxes to the side of a pole, practicalities exits which can drive solutions. In addition to the variables noted above, cost, reliability, durability, resistance to environmental conditions, and other factors can affect how such boxes are mounted to poles.

Additionally, many times there is a need for some flexibility. As indicated above, it is potentially desirable that a mounting method accommodate multiple configurations of poles or boxes. For example, outdoor sports lighting many times requires multiple light fixtures utilizing substantial electrical power to be elevated many tens of feet (e.g. 35–130 ft.). Sometimes hollow steel poles are utilized. Sometimes wood or even concrete poles are utilized. The diameters differ depending on elevation height of the fixtures and environmental conditions. Most such sports lighting is out of doors, requiring special consideration for durability over decades of time.

Correspondingly, electrical and other related equipment associated with operation of such lights many times need to be in relatively close proximity to the lights. Such components and equipment, for example ballasts, contactors, fuses, capacitors, switches, and other components well known in the art, must be housed and shielded from direct access for safety reasons, and enclosed from the environment and vandalism. Many different configurations of equipment are possible. Therefore, many different configurations of enclosures exist. For example, the owner of the present application, Musco Corporation, has over one hundred different configurations of enclosure boxes.

As can be appreciated, if each of a wide variety of different enclosure box configurations exists, with no substantially uniformity between them, inefficiencies in manufacturing can exist. Each separate design requires different fabrication steps and, therefore, this is antithetical to efficient mass production. Additionally, if the wide variety of enclosure box designs results in unavailability of a design during manufacturing or assembly of a lighting system, it can result in potentially costly delays.

Musco Corporation has attempted to develop enclosure box attachment apparatus and methods then address many of the issues in the art. For example, Musco Corporation, as well as others, have for years used straps to attach enclosure boxes along a pole. Usually some sort of bracket is welded or rigidly affixed to the back of an enclosure box and straps are threaded through the bracket and adjustable to cinch the box to the pole. This can be cumbersome, because attachment by straps involves substantial time and effort. If done after the pole is erected vertically, if is cumbersome to hold a loaded enclosure box in place while attaching the straps to the pole and the box to the straps. By further example, Musco Corporation U.S. Pat. No. 5,600,537, e.g. at FIG. 43, discloses an attachment systems for ballast boxes for poles that allows the ballast box to be hingably and releasably connected to a bracket along the pole and then swung into place, with alignment between an opening into the ballast box and an opening in the pole side. This requires a bracket along the pole to be welded or otherwise rigidly connected to the pole.

However, there is still room for improvement in the art. The prior attempts add the cost and expense of fixedly attaching brackets to the enclosure box or the pole. Also, there is room for improvement in an enclosure box mounting system which can use similar or the same components for a wide variety of sizes of enclosure boxes.

Still further, there is a need in the art for enclosure box attachment systems and method which allow for easier and more efficiently mounting of enclosure boxes to poles, as well as meeting needs for reliable, durable, long lasting attachment to the pole.

II. BRIEF SUMMARY OF THE INVENTION

It is therefore a principal object of the present invention to provide an apparatus, method, and system which improves over or solves problems and deficiencies in the art.

A further object, feature, aspect, or advantage of the present invention is to provide an apparatus for mounting enclosure boxes along a pole which is flexible relative to different poles and enclosure boxes, provides a durable, reliable attachment, and is economical to manufacture, install, and maintain.

In one aspect of the invention, an apparatus for mounting enclosure boxes along a pole comprises a hanger bracket having a pole facing side with structure that assists in centering the bracket, and thus an enclosure box, along the pole. The hanger bracket includes a connection adapted to receive and support an enclosure box independent of attaching the hanger bracket to the pole. A cinching member is adapted to connect to or abut the hanger bracket and surround a pole, and is adjustable to cinch or otherwise mount the hanger bracket to the pole. The enclosure box can be releasably connected to the hanger bracket.

In another aspect of the invention, the hanger bracket is a channel-shaped member having a longitudinal axis. A plate comprises the outer facing side of the hanger bracket. Two parallel opposite walls of the channel, having free edges on opposite sides of the axis of the bracket, are spaced apart such that those edges comprise the pole side of the bracket. A connection on the hanger bracket can be built into the structure of the channel such that a portion of the enclosure box can be inserted into and dropped down to use gravity to support and capture a part of the enclosure box. The free edges would abut along the longitudinal axis of a pole and thus self-center the bracket along the pole. The cinching member can comprise a strap or other structure that cooperate to surround the pole and cinch or otherwise mount the hanger bracket to the pole.

In another aspect of the invention, the cinching member comprises a cinching strap having members at opposite ends that can be releasably connected to a second bracket. The second bracket has a pole-facing side and an outer-facing side. The pole-facing side can have edges that self center the second bracket on the pole. The opposite ends of the strap releasably connect to the second bracket and are adjustable to adjust the amount of cinching.

In another aspect of the invention, a method of mounting enclosure boxes includes utilizing a separate member having a connection for releasably mounting an enclosure box. The member is mountable along the side of a pole independently of the enclosure box.

In another aspect of the invention, a system includes a plurality of enclosure boxes of different sizes, a connection on each box, and one or more hanger brackets being adjustably, cinchably or otherwise mountable to a pole. Each hanger bracket has a size correlated to the size of the enclosure box(es) with which it will be used, and at least one cinching member is correlated to the size of the enclosure box(es).

Other objects, aspects, features, and advantages of the present invention will become more apparent with reference to the accompanying specification and claims.

III. BRIEF DESCRIPTION OF THE DRAWINGS

FIG. 4A is a side elevation view of the components of FIG. 3A as assembled to a pole.

FIG. 4B is a top plan view of FIG. 4A.

FIG. 5A is similar to FIG. 4A but corresponds to the structure of FIG. 3B.

FIG. 5B is a top plan view of FIG. 5A.

FIG. 6A is a side elevation similar to FIG. 4A showing a different enclosure box but similar mounting hardware.

FIG. 6B is similar to FIG. 5B but showing a different a different enclosure box and substantially similar mounting hardware.

Figure 1:
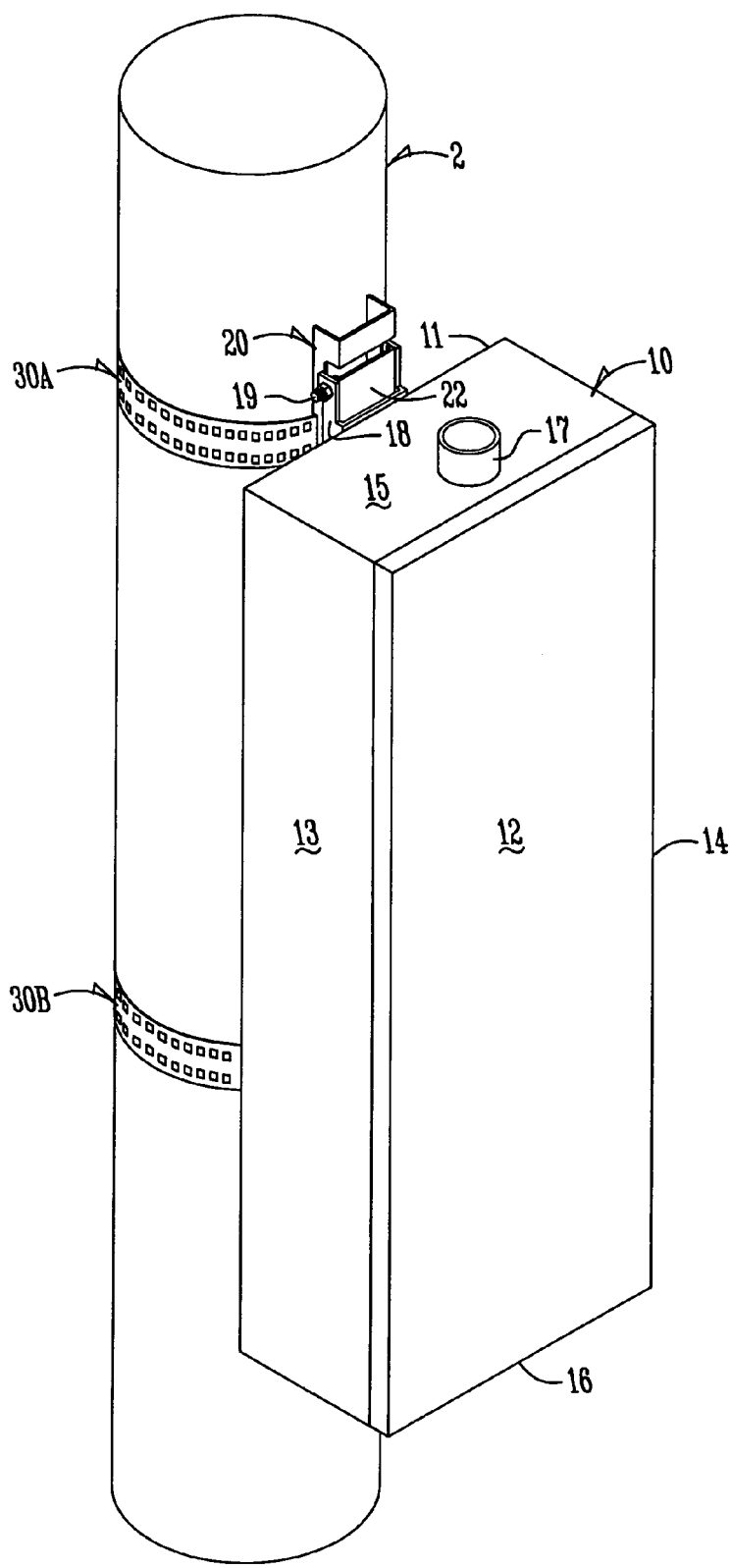
FIG. 1 is a partial perspective view of an enclosure box attached along the side of a pole according to an embodiment of the present invention.
Figures 3A, 3B:
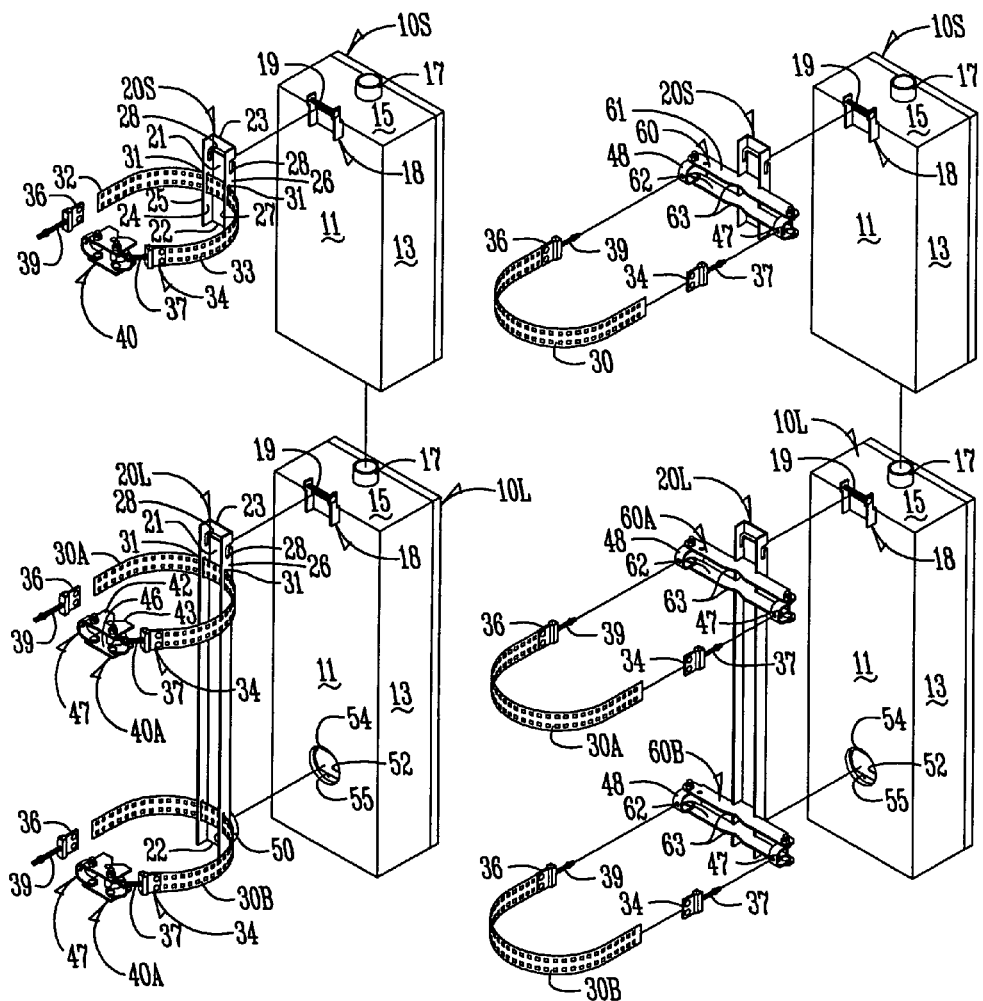
FIG. 3A is an exploded perspective view of two different sizes of enclosure boxes and pole mounting apparatus according to an embodiment of the present invention.
FIG. 3B is similar to FIG. 3A except showing a different embodiment of mounting hardware for two enclosure boxes.

FIGS. 9A and B are perspective views similar to FIG. 1 showing attachment of multiple enclosure boxes at approximately the same vertical height along a pole using attachment hardware like that shown in FIG. 3A.

FIGS. 10A–10C are similar to FIGS. 9A and 9B but show attachment structure similar to FIG. 3B.

Figure 11:
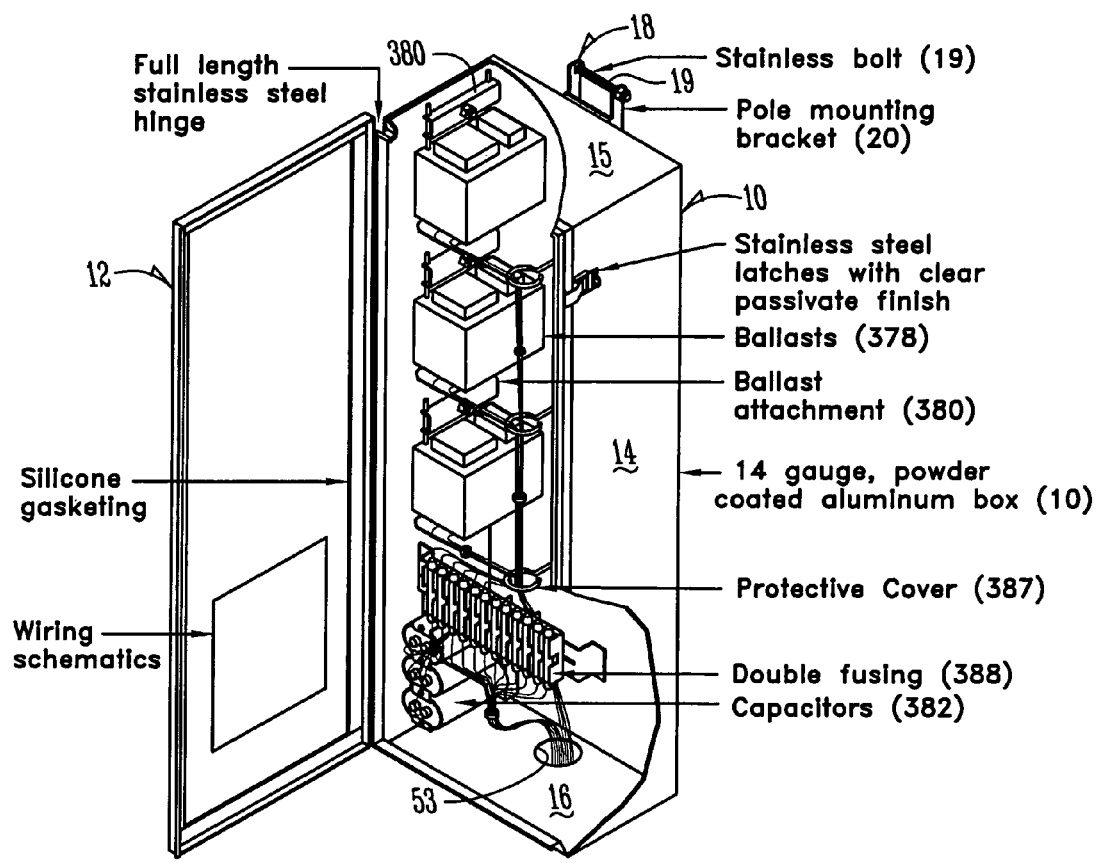

FIG. 11 is an enlarged perspective view (partially cut away) of an enclosure box that can be mounted to mounting apparatus such as disclosed in FIGS. 3A and 3B, but further showing mounting structure for electrical components inside of the enclosure box, according to another aspect of the invention.

Figure 12A:
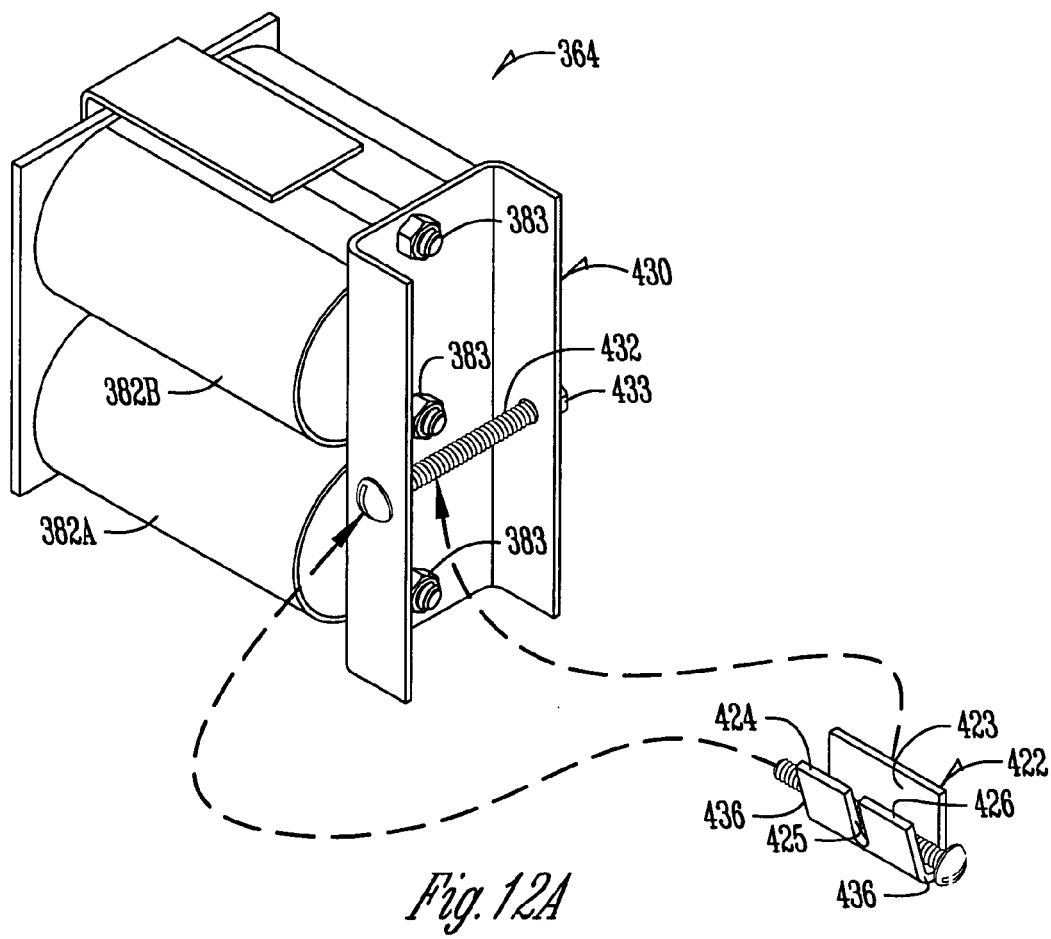
Figure 12B:
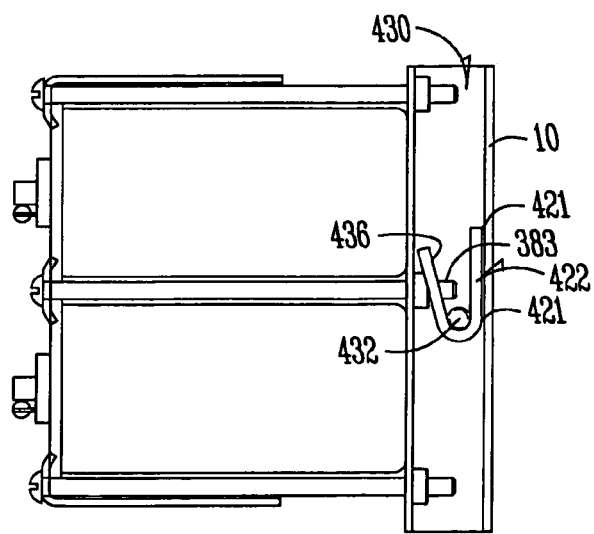
Figure 12C:
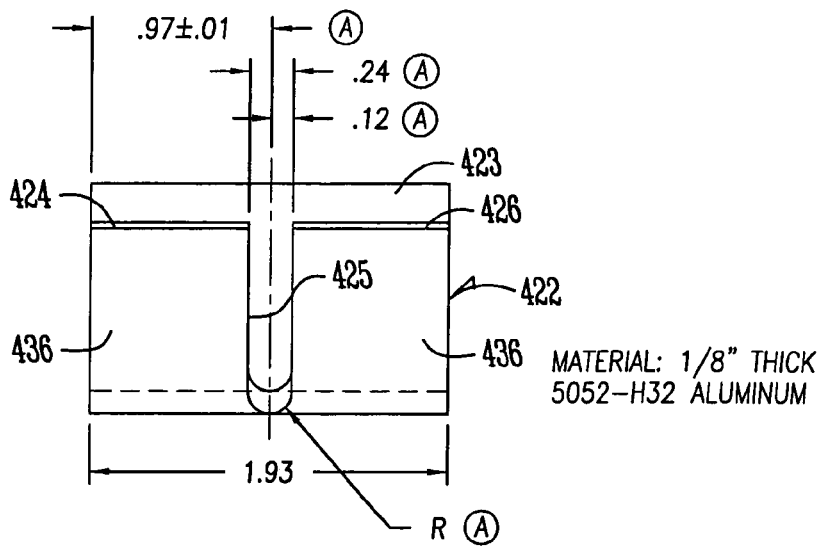
Figure 12D:
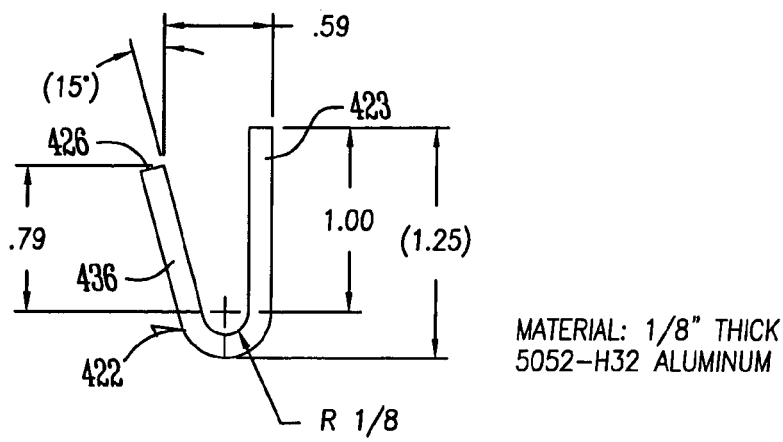
Figure 12F:
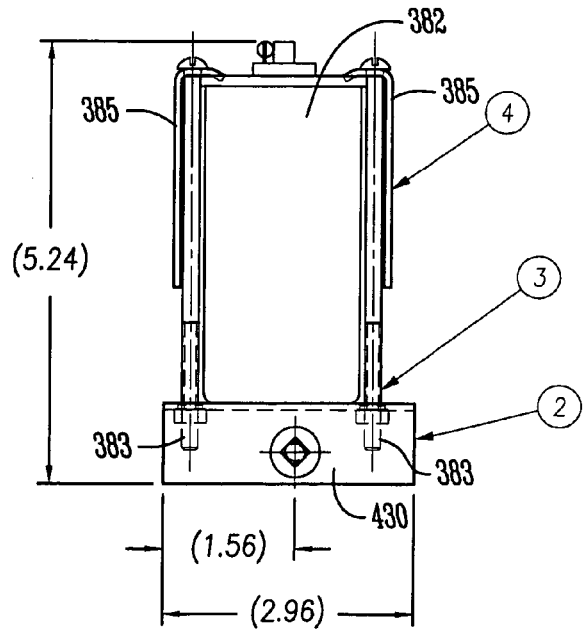
Figure 12I:
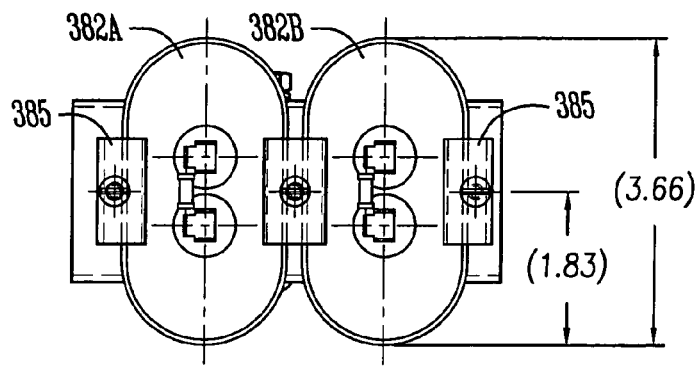
Figure 12K:
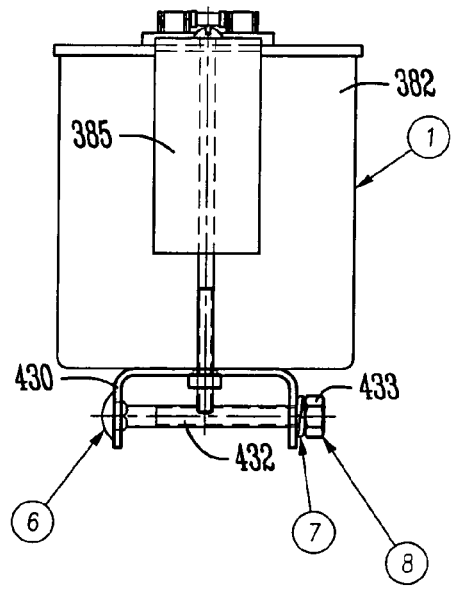
Figure 12L:
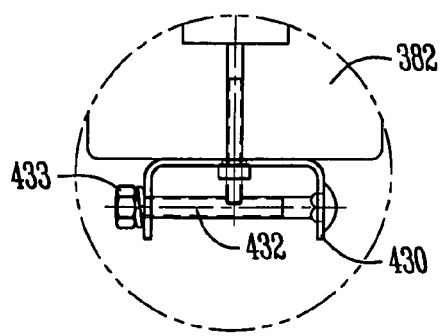
Figure 12J:
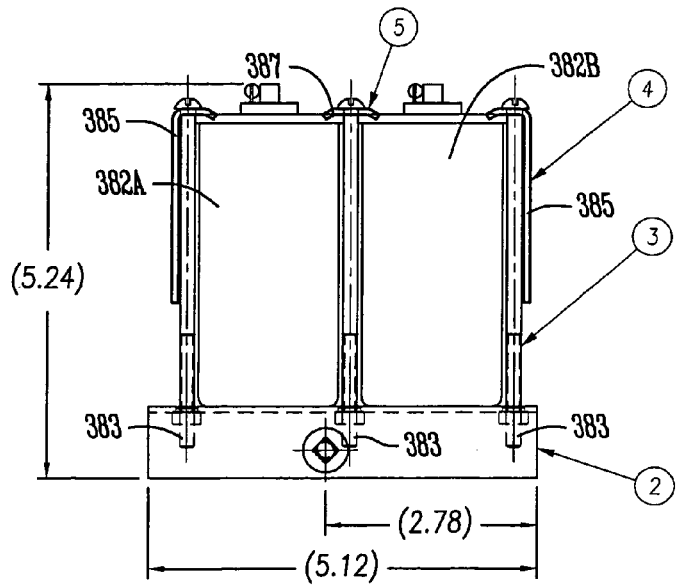
Figure 12M:
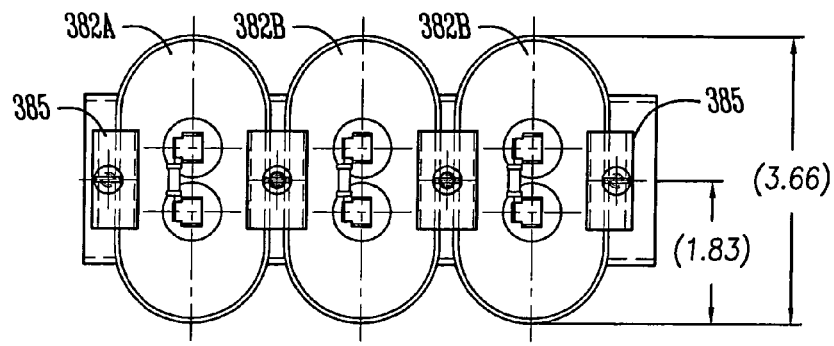
Figure 12O:
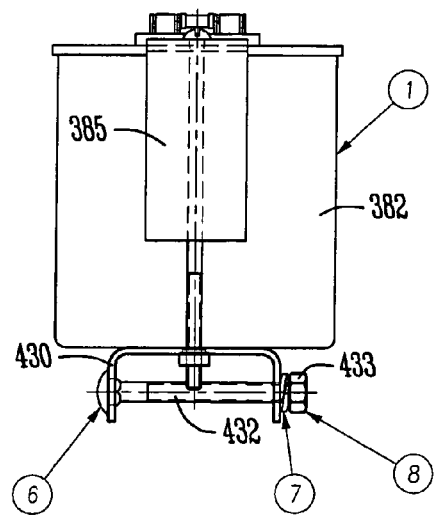
Figure 12P:
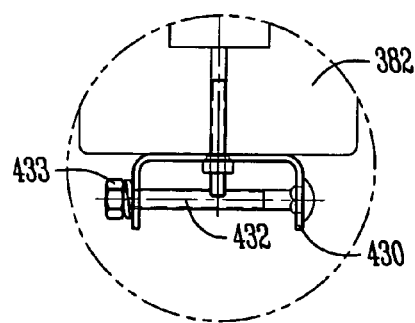
Figure 12N:
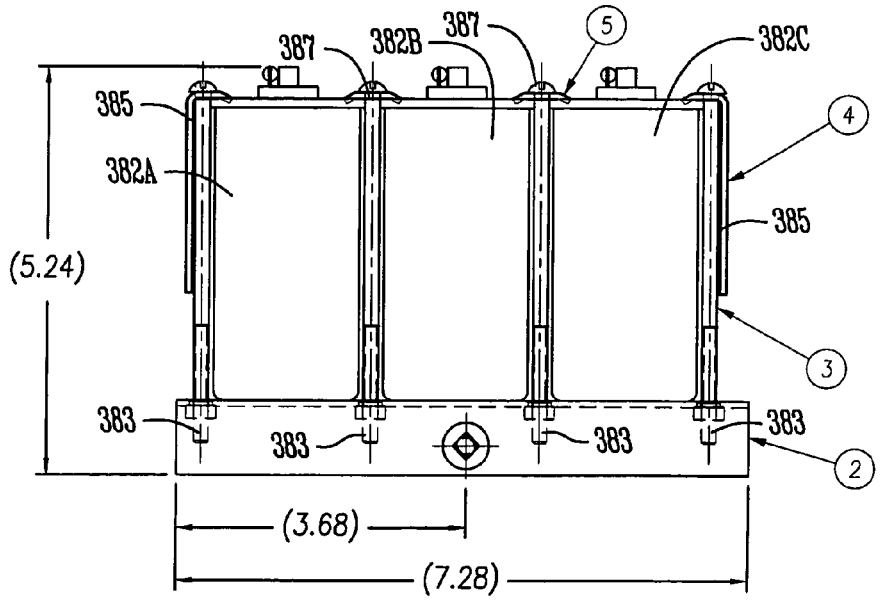

FIG. 12A is an exploded view of mounting structure for electrical components inside of an enclosure box, as illustrated in FIG. 11. FIGS. 12B–P are various views of components of FIG. 12A or alternatives thereto.

Figure 13A:
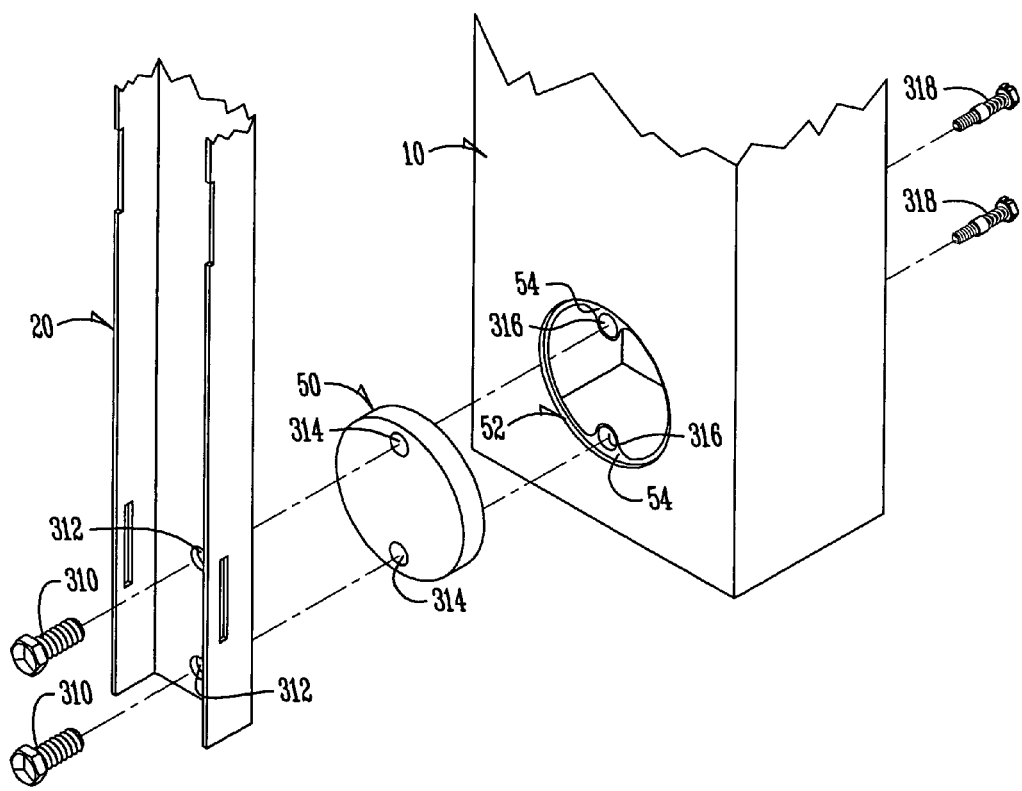
Figure 13B:
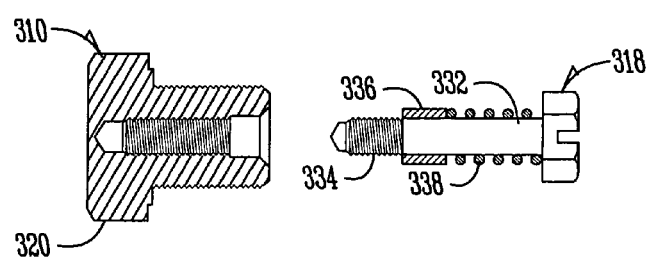
Figure 14A:
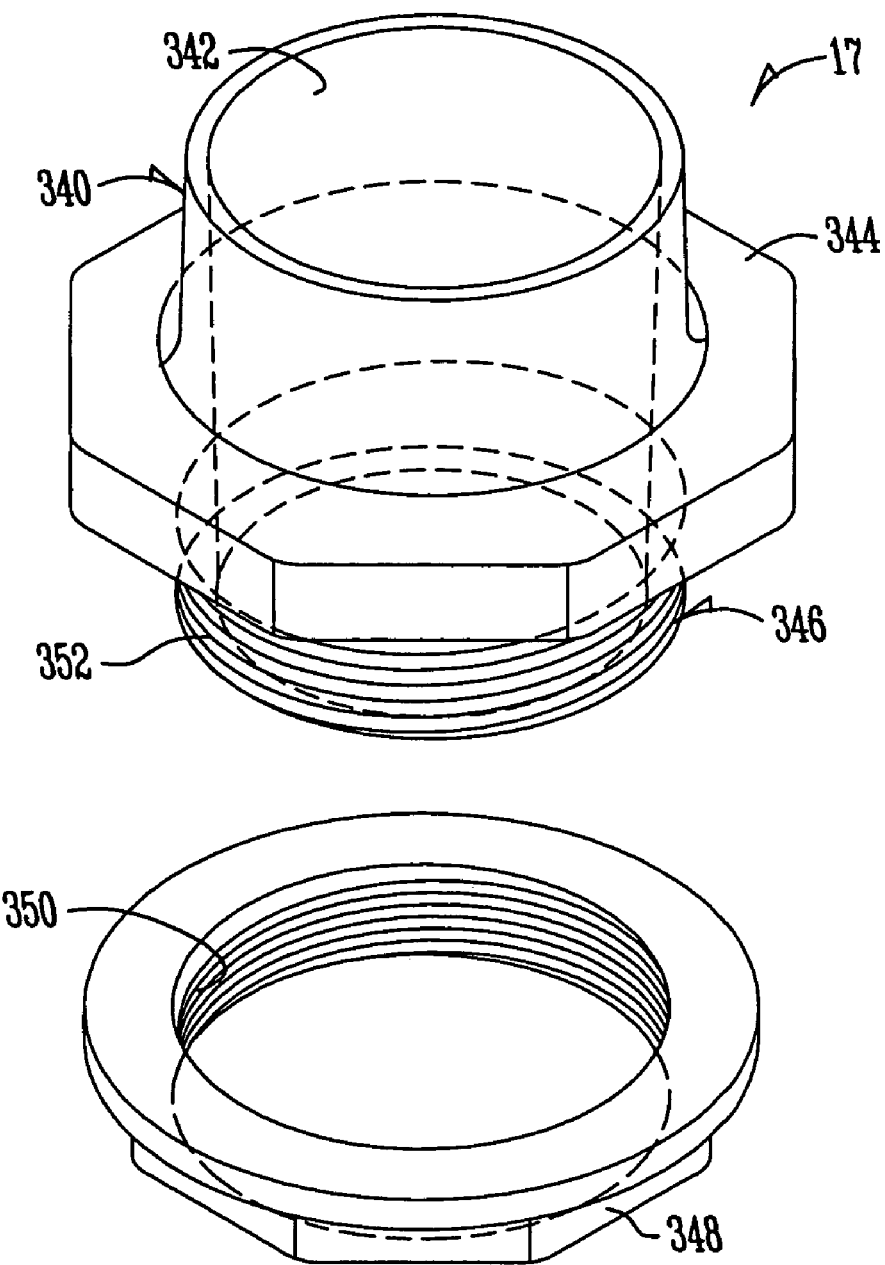
Figure 14B:
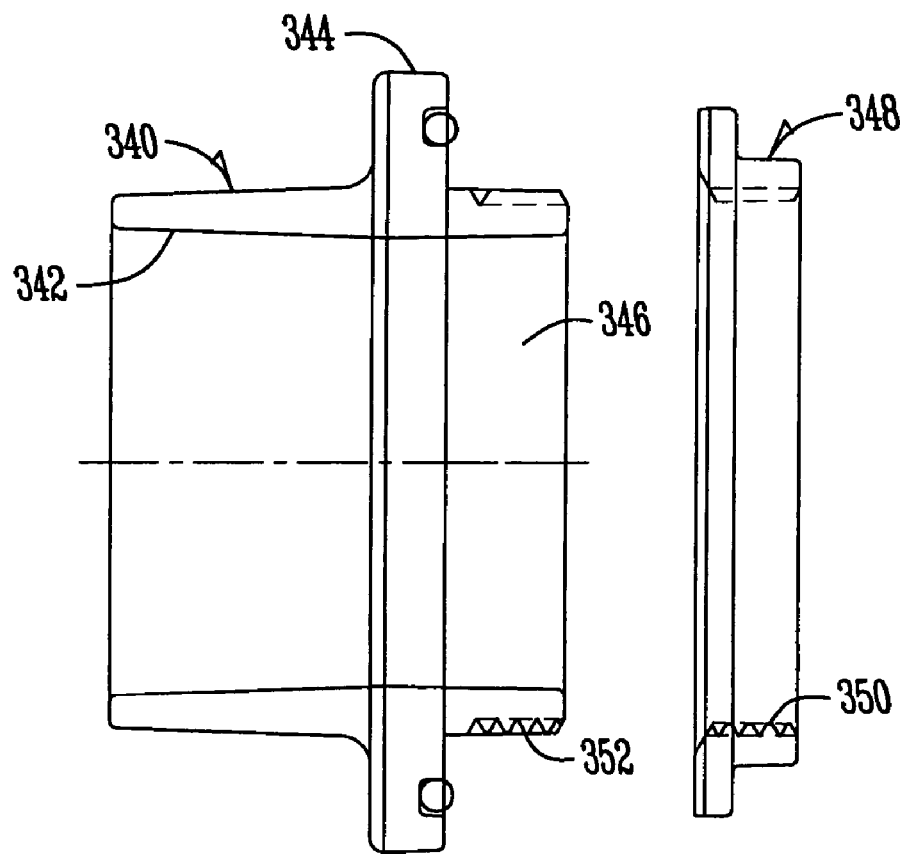
Figure 14G:
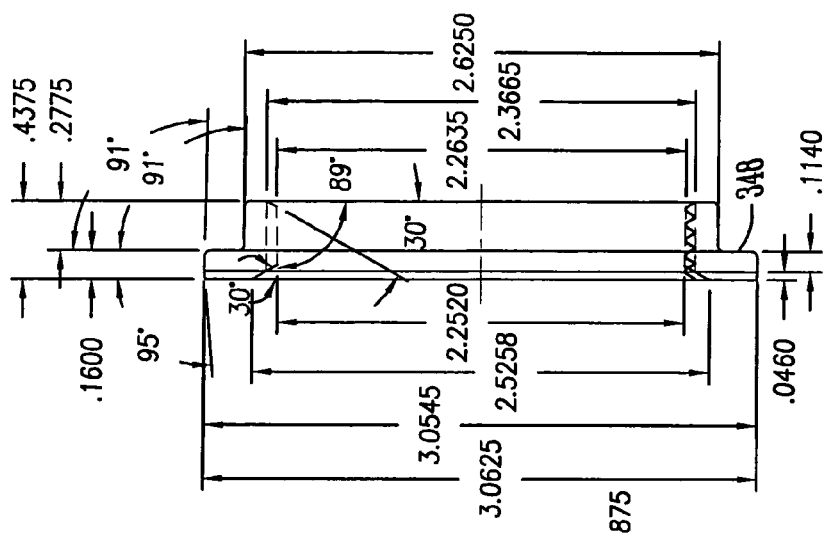
Figure 14F:
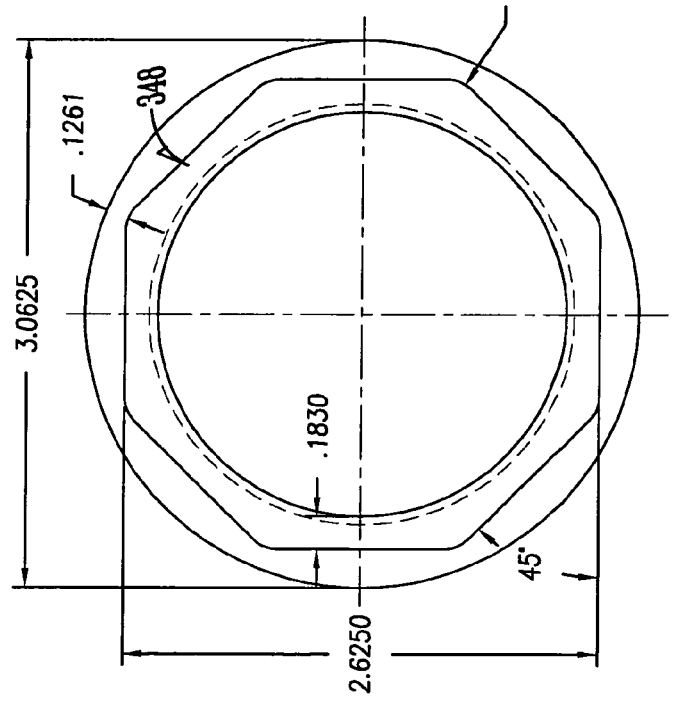
Figure 14E:
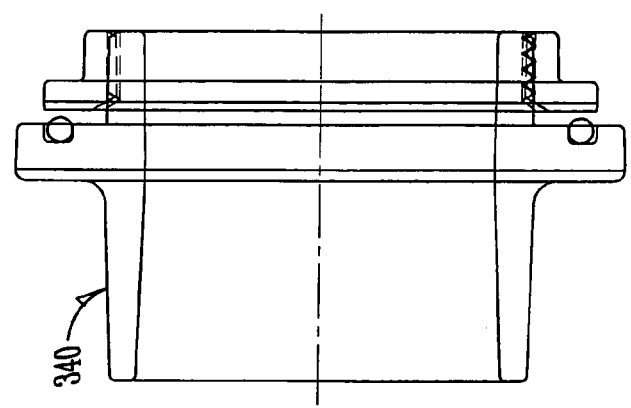

FIG. 13A is an exploded perspective view of a hub block optionally usable with mounting structure such as shown in FIGS. 3A and 3B to automatically center and help support the bottom of an enclosure box when in position along a pole. FIG. 13B is an enlarged view of mounting hardware used with the hub block.

FIGS. 14A–G are views of an inter-connection between top and bottom of adjacent vertically stacked enclosure boxes.

Figure 15:
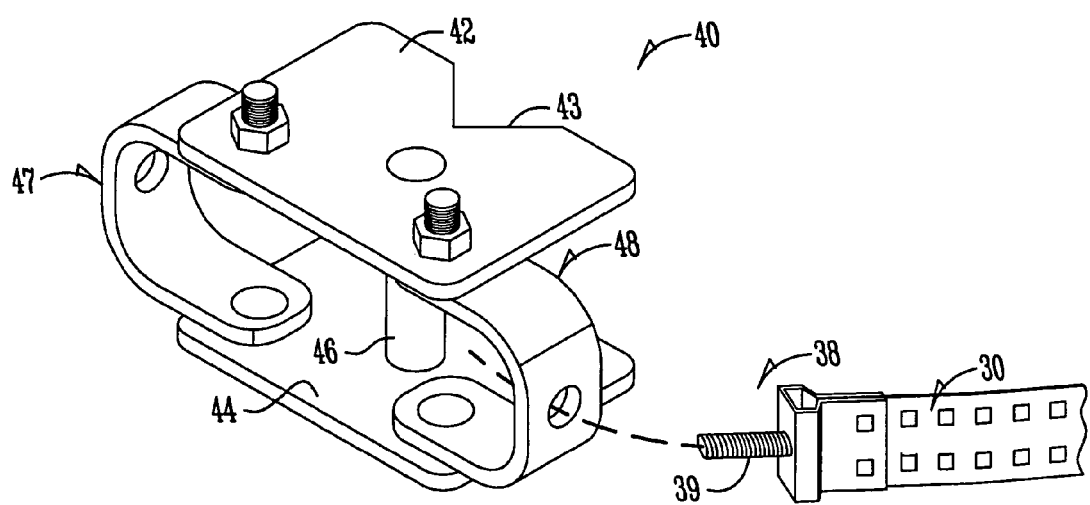

FIG. 15 is an enlarged perspective view of a second bracket usable with a cinching member in the form of straps as shown in FIG. 3A.

Figure 16:
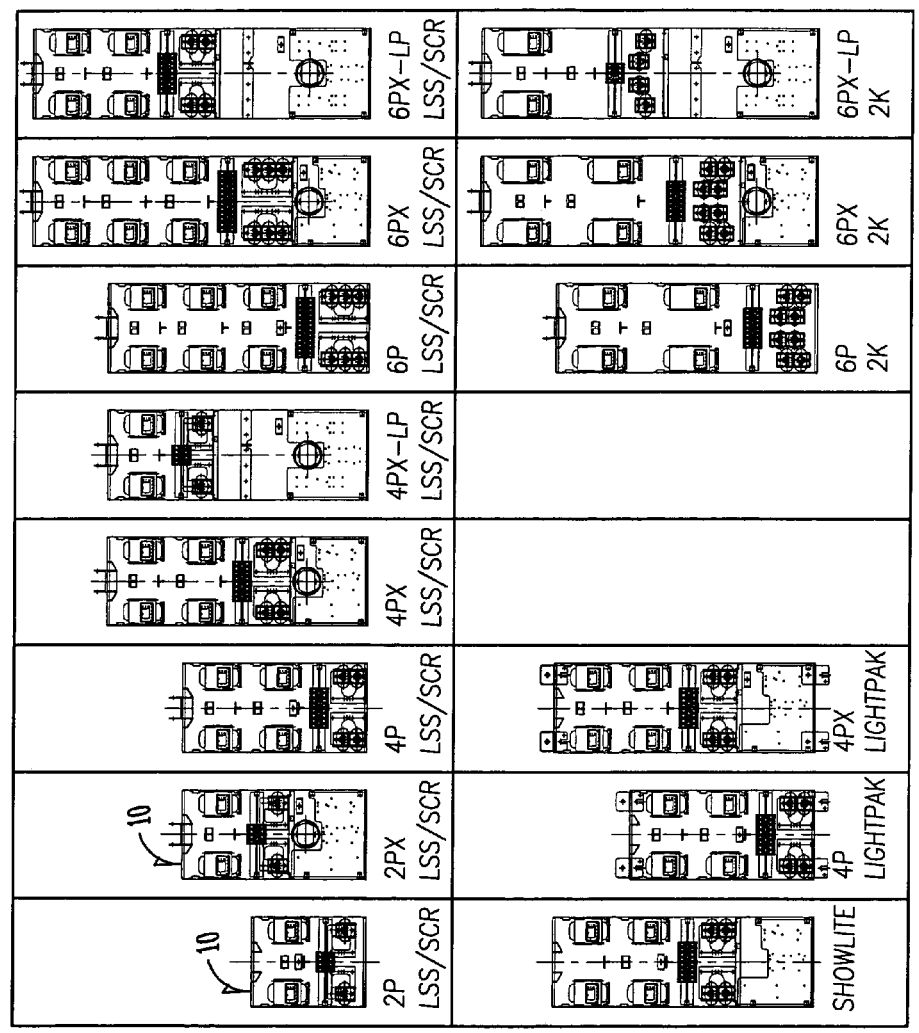

FIG. 16 is a comparison chart of a plurality of different sized enclosure boxes designed for interchangeable use with mounting structures such as shown in FIGS. 3A and 3B.

IV. DETAILED DESCRIPTION OF THE PREFERRED EMBODIMENT

A. Overview

For a better understanding of the invention, examples of forms the invention can take will now be described in detail. This description is for illustrative purposes only and not by way of limitation to the invention which is described solely by its claims.

Frequent reference will be taken to the above-identified drawings. Reference numerals and letters will be used to indicate certain parts and locations in the drawings. The same reference numerals or letters will be used to indicate the same parts or locations throughout the drawings, unless otherwise indicated.

B. General Environment of Exemplary Environments

This description of exemplary embodiments will be made in the context of substantially tall (e.g. 35 ft. to well over 100 ft.) poles used for outdoor wide area sports lighting applications. Currently such poles can be made of different materials (steel, concrete, wood), or combinations of materials. Many of the poles are tapered, having a slightly decreasing diameter from the bottom of the pole to the top of the pole. Such poles are well known in the art. The exemplary embodiments of the present invention have a substantial part made primarily of concrete, with a metal top portion. The embodiments are tapered.

Also, this description will refer at times to the items elevated by the pole. In these exemplary embodiments those items comprise one or more light fixtures utilizing high powered, high intensity discharge lamps and reflectors to generate substantial intensity of light in a controlled manner to a targeted area such as an athletic field (e.g. football field, softball field, soccer field). Many times such poles can suspend six or more such light fixtures. Each fixture usually requires an individual set of electrical components, electrically connected between the main source of electrical power and the fixture.

It is to be understood, however, that the invention is not limited to this environment and is applicable to analogous uses as well as other analogous functions, for example supporting a variety of types of enclosures or other structures along the side of a substantially sized pole or vertical support.

C. Structure of an Exemplary Embodiment of Mounting Hardware

With particular reference to FIGS. 1, 3A, 4A and B, an exemplary embodiment of an apparatus for mounting enclosure boxes along a pole 2 is shown.

As can be seen in FIG. 1, an enclosure box 10 comprises a pole side or back side 11, an outer facing or front side 12

(here comprising a door that is hingable along one side and can be latched or locked in position shown in FIG. 1), a left side 13, right side 14, a top 15, and a bottom 16; all enclosing an interior space. Optionally, an interconnecting hub 17 can be formed in top 15 to communicate electrical cables or other structure to an enclosure box positioned above the one shown in FIG. 1. As can be appreciated, interconnecting hub 17 could have a closure (not shown) that could seal it off from the environment, if it is not used to communicate with another enclosure box.

FIGS. 14A–G show in more detail a threaded interconnect 17 for securing adjacent enclosures 10, as previously described. A tubular body 340 has a through-bore 342 and an externally threaded lower end 346 (threads are shown at 352). A flange 344 extends radially outwardly from body 340 above threads 352. A clamping member or threaded nut 348 has an internally threaded through-bore 350. A hole in top 15 of box 10 is smaller in diameter than flange 344 and nut 348, but allows passage of threaded end 346. The hole can be pre-manufactured into box 10. Alternatively, it can be formed after manufacturing. Still further, it can be partially formed so that an installer can knock the hole out on-site, if it is needed. To fix piece 17 in the hole in box 10, end 346 is inserted into the interior of box 10 through the hole in top 15 of box 10 and nut 348 threaded onto end 346 until flange 344 and nut 348 abut opposite sides of top 15 around the hole in it. Nut 348 can be tightened under end 346 to clamp piece 17 in place. Gaskets or other sealing methods can be used to seal piece 17 to box 10. Interior through-bore 342 may be unthreaded (particularly when piece 17 is used between boxes 10), or can be internally threaded (particularly when piece 17 is placed in the top of a top most box 10). Internal threading of bore 342 allows easy attachment of externally threaded conduit, such as would enter the top most box on a pole and extend up to lighting fixtures or other equipment at the top of the pole. Thus, member 17 can be used as a connection between a box 10 and some other device, as opposed to an inter-connection between adjacent boxes.

In FIG. 1, enclosure box 10 is elongated between top 15 and bottom 16. A hanger bracket 18, including two parallel arms with a bar 19 (see FIG. 3A) spanning the two arms, is welded or otherwise rigidly affixed to box 10 such that bar 19 extends above the plane of top 15 of box 10.

A separate receiver bracket 20 has a top end 21 and bottom end 22. It is basically channel shaped or u-shaped in cross section, including a front plate 23 bounded on opposite sides by a right plate 24 with a free-edge 25 and a left plate 26 with a free edge 27.

What will be called a receiver 28, formed in receiver bracket 20, is actually a cut-out through front plate 23 and side plates 24 and 26, in the configuration shown. Receiver or cut-out 28 is configured to receive bar 19 of box 10 when entered horizontally from the outer side of receiver bracket 20, and then allows it to move vertically downward in longitudinal slots in left and right plates 24 and 26 such that bar 19 would be both captured and supported by receiver bracket 20 when it abuts the bottom of cut-out 28.

FIG. 1 further illustrates cinching mechanisms or members 30. In the embodiment of FIG. 1, a top cinching member strap 30 can be fit through slots 31 (see FIG. 3A) in right and left plates 24 and 26 of bracket 20. Free ends 32 and 33 of strap 30 have end connectors 34 and 36 fixed thereto. End connectors 34 and 36 include an outwardly extending threaded rods 37 and 39 respectively.

What will be called an M-bracket 40 (see also FIG. 15) includes a top plate 42, bottom plate 44, and posts 46 connecting plates 42 and 44 in a rigid manner. U-members 47 and 48 are pivotally attached between plates 42 and 44. Each U-member 47 and 48 includes an opening that receives the free end of a corresponding threaded rod 37 and 39. An appropriate nut can be threaded on to the free end of threaded rods 37 and 39, once inserted into U-members 47 and 48, to secure M-bracket 40 to the opposite ends of strap 30.

FIG. 15 illustrates in enlarged fashion the structure of M bracket 40. It can be made of galvanized steel.

As illustrated in FIGS. 1, 3A, and 4A, this configuration allows: (a) a strap 30 to be inserted through slots 31 in receiver bracket 20, (b) the pole side of receiver bracket 20 brought into general alignment along pole 2, (c) the free ends 32 and 33 of strap 30 brought around the pole 2 from opposite sides and (d) the free ends of threaded rods 37 and 39 inserted in to U-members 47 and 48 of M-bracket 40 with the V-cut 43 in top and bottom plates 42 and 44 of M bracket 40 aligned towards the opposite side of pole 2.

As can be seen in the Figures, strap 30 can be configured to have two rows of openings along the entire length of strap 30. Strap 30 can therefore be pre-cut in length to approximate the circumference of a pole 2 to which it will be used, and end connectors 34 and 36 attached using the distal-most set of adjacent holes on each end of strap 30 to bolt or otherwise secure end connectors 34 and 36 to opposite ends of strap 30. The length of threaded rods 37 and 39 allows adjustability of end brackets 40 relative to the opposite ends of strap 30 such that a wrench can be used to cinch and tighten receiver bracket 20 to pole 2 by tightening bolts down on one or both distal ends of threaded rods 37 and 39 once inserted through U-members 47 and 48.

As can be appreciated, the channel-shape of receiver bracket 20, with free edges 25 and 27 of side plates 24 and 26 abutting along the longitudinal length of pole 2, as well as V-cuts 43 in M-bracket 40 abutting the opposite side of pole 2, facilitate a type of self-centering of both bracket 20 and M bracket 40 on pole 2. The edges abutting pole 2 also can serve to provide some bite into, or resistance to longitudinal movement relative to pole 2, once installed and strap(s) 30 are cinched to pole 2.

As can be appreciated, U-members 47 and 48 are pivotally attached between upper and lower plates 42 and 44 of M-bracket 40. This allows non-binding insertion of threaded rods 37 and 39 into U-members 47 and 48, over a range of pole diameters 2. It also resists creating forces between or in M-bracket 40 or strap 30 which would tend to tear or bend or otherwise weaken the connection.

Thus, as illustrated in FIGS. 1, 3A and 4A, an attachment apparatus or hardware can be independently cinched to pole 2 in a desired position. Once such hardware, namely receiver bracket 20, and one or more straps 30 with one or more end brackets 40, is cinched into place on pole 2, enclosure box 10 can be manipulated into position such that bar 19 enters generally horizontally into receiver 28 and bracket 20. Box 10 can then be lowered such that bar 19 drops into the vertical extensions of receiver 28. Enclosure 10 is thereby preliminarily supported on pole 2.

Preferably, some additional structure or method is used to attach box 10 to pole 2, preferably towards the lower end of box 10. It is usually desirable that additional attachment methods be such that vertical movement of box 10 relative to bracket 20 is prohibited, and that any swinging or pivotal movement of box 10 outward from pole 20 around bar 19 is prohibited. In such manner, the installer can first attach a mounting structure to pole 2 without having to simultaneously position or hold a box 10 in place. Box 10 can after that be brought into position, and quickly preliminarily supported by receiver 28 and bar 19. A final step allows the attachment of box 10 at another point (preferably towards or at a lower end of box 10) and precluding pivotal or vertical movement. Box 10 and its contents can be quite heavy (e.g. over 100 lbs.), and therefore without bar 19 and receiver 28, connection of box 10 can be quite cumbersome and difficult, especially if done after pole 2 is erected.

FIGS. 3A and 4A illustrate one way to secure the bottom of box 30. What will be called a mechanical hub 50 can be formed in or separately attached towards the bottom of receiver bracket 20. An opening or aperture 52 is formed in the pole side 11 of box 10. The perimeter of mechanical hub 50 is predesigned to matingly fit into opening 52 in box 10. Additionally, mechanical hub 50 and opening 52 are predesigned to be spaced from receiver 28 and bar 19 in bracket 20 and box 10, respectively, such that when bar 19 is seated in the bottom of the vertical slots of receiver 28 of bracket 20, mechanical hub 50 and opening 52 will be in alignment such that box 10 can be swung towards, and hub 50 will matingly fit into, opening 52. Flanges 54 and 55 can partially span a portion of opening 52, but be recessed from the plane of side 11 of box 10, and have apertures that could receive bolts or screws that could be inserted from the inside of box 10 and into receiving openings or threaded bores in mechanical hub 50. Such a combination would fix the lower end of box 10 to mechanical hub 50, which in turn would be fixed to the lower end of receiver bracket 20. The mating fit of hub 50 and opening 52, and its attachment to hub 50, would prevent movement of box 10 in any direction relative to bracket 20, and thus prevent bar 19 from moving vertically relative to bracket 20 and leaving receiver cut out 28 in bracket 20.

FIGS. 13A and B show in more detail block 50, mounting bolts, and self captured screws, as previously described. Block 50 can be a cylindrical piece with two threaded, spaced apart through-bores 314. Opening 52 in the back of box 10 is recessed. Block 50 seats into this recess so that it can not move radially. Flanges extend radially inwardly in opening 52 and prevent further inward movement of block 50 when seated. Flanges have apertures 54 aligned with bores 314 of block 50. Bracket 20 includes two apertures 312, aligned with bores 314. Bolts 310 have a head 320, a threaded body 322 that is threadable into a bore 314 of block 50, such that block 50 can be attached to the side of bracket 20 that faces away from the pole. As previously described and shown, block 50 is spaced from cut-out 28 such that when box 10 is hung on cut-out 28, block 50 is aligned with opening 52 is box 10. Self-captured screws 318, having a head 330, a body 332 with a threaded distal end 334, and bushing 336 captured along body 332, and a spring 338 between slideable bushing 336 and head 338, is adapted to threadably mate into bore 324, having an inner portion 326 threaded, in the end of bolt 310. Self-captured screws 318 can be shipped assembled in holes 316 in the back of box 10. Threaded at 334 would be threaded from the inside of box 10 through aperture 316. Thus, when the contractor hangs box 10 onto bracket 20 by box bracket 19, the embossment 52 in the back of box 10 will line up to hub lock 50 (position on back of 20) as well as casher screws 18 will line with hub lock bolts 310. All the contractor has to do is tighten screws 318 from the inside of box 10.

Additionally, as shown in FIG. 3A at the bottom combination, a second strap 30B could be threaded through slots in bracket 20 and assist in cinching the lower end of bracket 20 to pole 2. That arrangement would thus use a top strap 30A and bottom strap 30B, with two end brackets 40A and B, to cinch or otherwise mount an elongated receiver bracket 20 with a mechanical hub 50 at its lower end to pole 2.

Enclosure 10S would then be brought such that its bar 19 would horizontally enter cut out receiver slot 28 in bracket 20S. By appropriate alignment of brackets 20S and 20L, box 10S would be aligned above box 10L, and an interconnection, such as tube 17, could communicate the interiors of each box 10S and 10L, if desired.

However, as further illustrated in FIGS. 3A and 4A, one strap 30, with a shortened receiver bracket 20S and without a mechanical hub 50, could be used to stack a smaller enclosure 10S above larger enclosure 10L as follows. Strap 30 for bracket 20S would be inserted through slots 34 and 35 in bracket 20S. Bracket 20S would be placed along one side of pole 2 at an appropriate position above bracket 20L. Strap 30 of bracket 20S would be surrounded around pole 2, and M-bracket 40 used in combination with end connectors 36 and 38 to cinch bracket 20S to pole 20L. Enclosure 10S can then be allowed to drop downward such that a bottom opening in box 10S would align with, and matingly fit over, interconnect hub 17 on the top of box 10L (which has previously been attached to bracket 20L and secured in place). By appropriate methods, the bottom of box 10S could be fixed to hub 17 such that it would preclude movement in any direction. By this combination, box 10S could then be supported by bracket 20S and precluded from movement. It is also thus supported at bar 19 and receiver cut-out 28 and bracket 20S, as well as at or towards its lower end.

FIGS. 4A and B illustrate a box 10L in place and secured to a bracket 20L with two straps 30A and B and two end brackets 40A and B. FIGS. 4A and B also illustrate how the edges of bracket 20 abut along the length of pole 2.

It should be noted that bar 19 is essentially a threaded carriage bolt having a carriage bolt head on one side of bracket 18 and a tightenable nut on the other side of bracket 18. Box 10 will be further secured at its top by tightening the nut on bar 19. This will cause the walls of bracket 18 to deflect and clamp down onto bracket 20. This is to be performed after tightening capture screws 318.

FIG. 4B illustrates how those edges of bracket 20 assist in self-centering of bracket 20. This is important to prevent lateral shifting of box 10. FIG. 4B also shows how V-cuts 43 and bracket 40 assist centering those brackets and preventing a shift of those brackets to prevent rotation of box 10 around pole 2.

As can be appreciated, the contents inside of a box 10 can be relatively heavy. This arrangement for attachment of box 10 to pole 2 provides a mounting apparatus on pole 2 that is secure and durable, as well as robust enough to support a substantial amount of weight, such that the installer can have that mounting apparatus in place before having to raise and attach a loaded box 10.

FIGS. 3B, and 5A and B illustrate another exemplary embodiment. This embodiment is very similar to that described regarding FIGS. 1, 3A, 4A and 4B, with the following differences. Instead of threading a strap 30 through vertical side walls of a channel shaped receiver bracket 20, as in FIGS. 3A, 4A and 4B, one or more cross arms 60 are rigidly connected or integrally built into receiver bracket 20. As shown in FIG. 3B, cross arm 60 comprises first and second generally parallel plates 61 and 62. Pole-facing edges include a V-shape, U-shape, or otherwise form an indent 63 aligned along the longitudinal axis of bracket 20 to help center bracket 20 on pole 2. U-members 47 and 48, like those in FIG. 3A, are pivotally attached at the opposite outer ends of cross arm 60. In this manner, M-brackets 40 are not needed. Bracket 20, with at least one cross arm 60, is brought into abutment on one side of pole 2. Indent 63 centers the bracket automatically. Strap 30 is brought from the opposite side of pole 2 such that threaded rods 37 and 39 of end member 36 and 38, attached to strap 30, are connected to U-members 47 and 48. The nuts on threaded rods 37 and 39 are tightened, thus cinching bracket 20 to pole 2. Box 10 can then be mounted onto bracket 20S as previously described.

Figure 2:
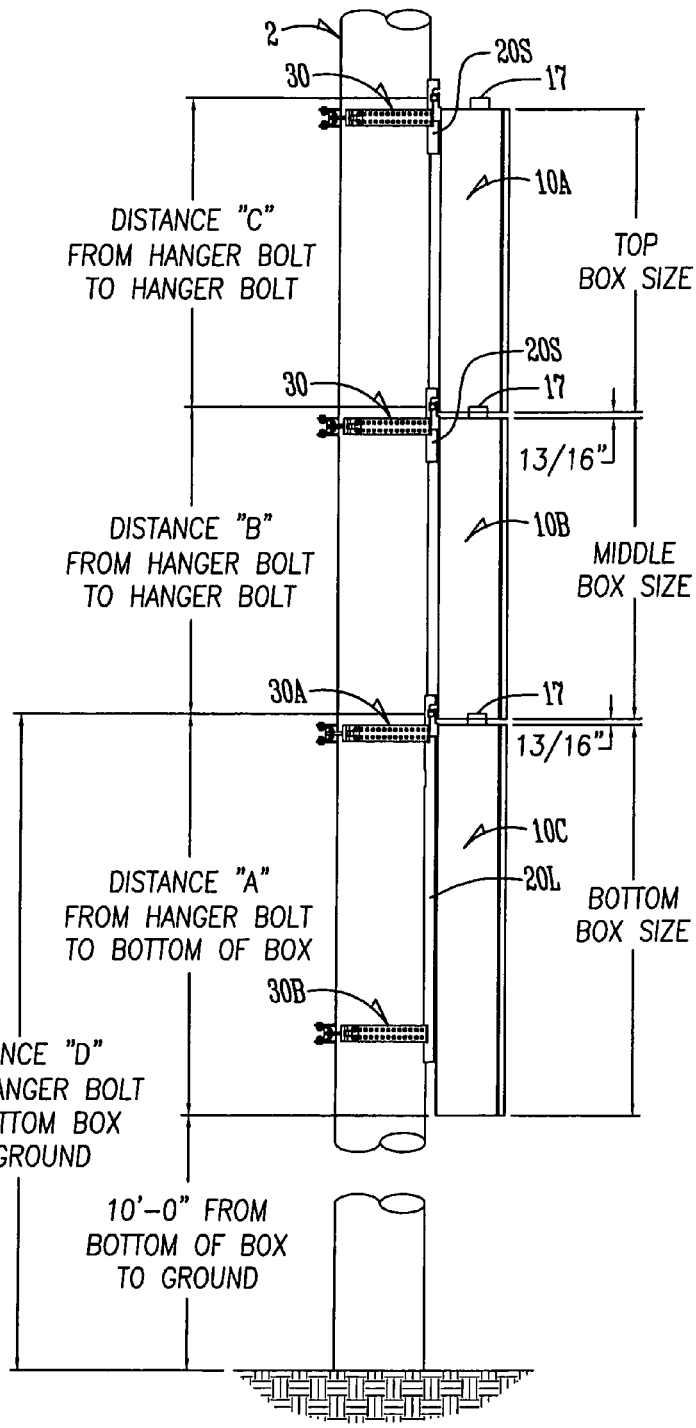
FIG. 2 is a smaller scale, side elevation of a pole with multiple enclosure boxes installed along the side of a pole, with mounting apparatus according to an embodiment of the present invention.

As further shown in FIGS. 3B, 5A and 5B, for larger boxes 10L, two cross arms 60A and 60B can be utilized with two straps 30A and 30B. For smaller boxes such as 10S, one strap can be used. Again, in the exemplary embodiment of FIGS. 3B, 5A and B, the lower end of box 10L is secured by using a mechanical hub 50 with an opening 52 in box 10L. The lower end of box 10S can be matingly fit into interconnecting hub 17 at the top of box 10L. Presently the lowest box 10 of any stack will have a bracket 20L with two cross arms and any additional box 10 stacked above it will have a single cross arm bracket 20S, regardless of the size of the box or boxes 10 stacked above the lowest most box 10 (see for example FIG. 2). This preference is for poles of diameters of less than 11 inches.

FIG. 5A, like FIG. 4A, illustrates how bracket 20L is abutted along the longitudinal axis of pole 2 and self centering. FIG. 5B illustrates how bracket 20, with cut out 63, self-centers on pole 2 and how strap 30 wraps around pole 2.

It is to be appreciated that the mounting structure of FIGS. 1, 3A, 4A and 4B is more suitable to larger pole diameters. For example, the embodiment shown in these Figures is designed for pole diameters over eleven inches, with a bracket 20 width of approximately three inches. On the other hand, the embodiments with cross arms 60 are designed for poles of less than eleven inches in diameter with a bracket width of approximately three inches. If the configuration of FIG. 3A were used with smaller poles, it is believed that there is greater potential for damage or failure to straps 30 because it would lend to fracturing or bending forces of strap 30 in the slots of M-bracket 20.

In the above-discussed exemplary embodiments, the width of brackets 20 is approximately three inches. The width of side plates 24 and 26 of brackets 20 are approximately 1½ inches. The channel of bracket 20 can be made of approximately ⅛ inch thick galvanized steel. Mechanical hub 50 can be approximately four inches in diameter and approximately ⅝ inch thick at its perimeter walls. A ½ inch bolt can be used to secure hub 50 to bracket 20.

Strap 30 is approximately 2⅛ inch wide by 1/32 thick stainless steel. The openings are spaced apart approximately ¾ inch on center and are approximately ⅜ inch square with adjacent edges of openings in each row spaced apart approximately 11/16 inch. Threaded rods or bolts 37 and 39 are approximately one inch long by ⅜ inch diameter. Nuts to secure threaded rods 37 and 39 can include lock washers, or other structures or methods, to deter loosening.

Top and bottom plates 42 and 44 of M-bracket 40 are approximately 3¾ inch wide by approximately 2¾ inches in depth. Plates 42 and 44 are approximately 3/16 inch thick galvanized steel and are spaced apart from one another approximately 2⅛ inches. U-members 47 and 48 are made from similar thickness material, and are approximately one inch wide with ¼ inch bolts securing them in a pivotal fashion to bracket 40.

The horizontal openings in cut-out receiver 28 of bracket 20 are approximately 9/16 inch wide. The vertical portion of the cut out is approximately 1½ inches, leaving approximately ⅞ inch between the bottoms of the horizontal slot and the bottom of the vertical portions of cut out 28. The diameter of bar 19 is approximately ⅜ inches. The two arms of hanger bracket 18 are spaced apart to be slightly wider than the width of bracket 20.

The slots 31 in bracket 20 to receive strap 30 are approximately 2¼ inches long by ¼ inch wide. Two bolts are preferable to attach hub 50 to bracket 20.

The length of bracket 20 depends on the length of its corresponding box 10. Typical lengths of bracket 20 can be 25⅜ inches, 37⅜ inches, and 49⅜ inches. Others are possible of course.

D. Options and Alternatives

The above exemplary embodiments are but several forms for practicing the invention. Variations obvious to one skilled in the art will be included within the invention.

For example, the precise dimensions and materials can vary according to desire and need. Additionally, the size and dimensions of box 10 can vary according to desire and need, as can the materials.

Still further, other options or alternatives are depicted at FIGS. 6A and 6B. Conduit or wiring can extend out of a hub 17 or the bottom of box 10 (see conduit 70 and 72) and either be routed up the pole (e.g. to lighting fixtures at the top), or into the interior of the pole for routing down through the pole and into a base or the ground. Either type of cinching discussed earlier could be used (compare FIGS. 6A and 6B, which utilize the cinching combination of FIG. 3A or 3B respectively).

Figure 7A:
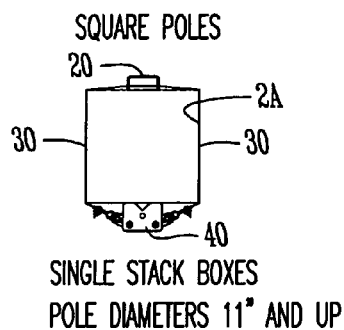
FIGS. 7A–7D are top plan views of mounting hardware of the type similar to that shown in FIG. 3A for different sizes and shapes of poles.

FIGS. 7A–7D illustrate how the cinching mechanism of FIG. 3B can be used for different sized and shaped poles. For example, FIG. 7A shows a square-shaped pole cross-section (pole 2A) with a diameter of 11 inches or bigger. It can be seen how the inherent flexibility of strap 30, even though stainless steel, allows cinching with M-bracket 40. The alignment of the pole facing edges of plates 42 and 44 of M-bracket 40 in essentially the same plane allows it to sit flush against a plane or side of pole 2A.

Figure 7B:
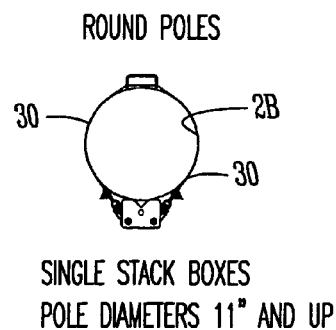

In contrast, FIG. 7B illustrates essentially the arrangement of FIG. 3A on a round pole diameter of 11 inches and up, as previously discussed.

Figure 7C:
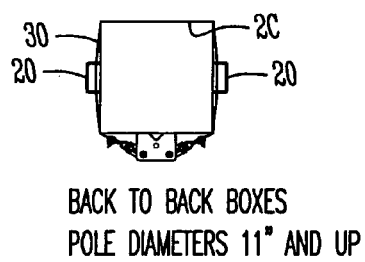

FIG. 7C illustrates the same configuration as FIG. 7A. However, note that two brackets 20 could be positioned on opposite sides of the square pole 2C. Strap 30 could be threaded through aligned slots in both brackets 20 and cinch both brackets 20 to the same pole on opposite sides of the pole. This would allow two enclosure boxes 10 to be attached on opposite sides of the same pole.

Figure 7D:
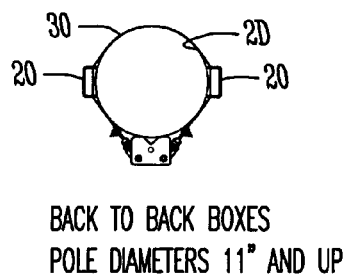
Figure 8A:
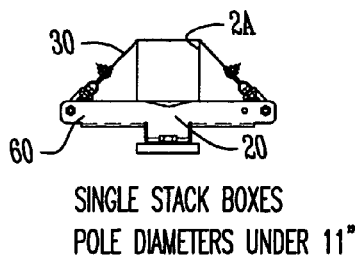
FIGS. 8A–8D are top plan views of mounting structures similar to that shown in FIG. 3B for different sized and shaped poles.
Figure 8B:
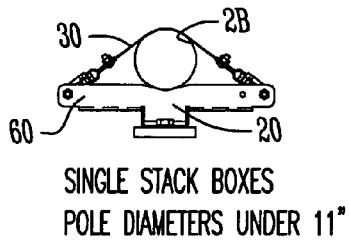
Figure 8C:
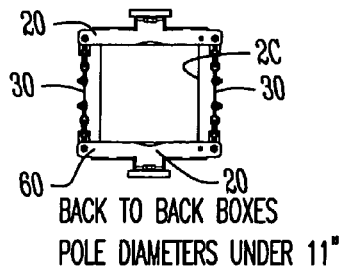
Figure 8D:
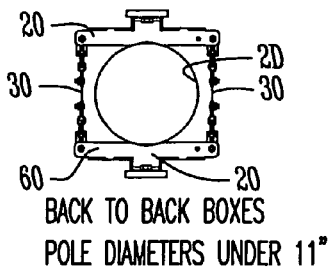

FIG. 7D is similar to FIG. 7C except shows a strap 30 and two receiving brackets 20 on opposite sides of a round pole of 11 inches or larger in diameter.

FIGS. 9A and 9B illustrate in more detail back-to-back enclosure boxes 10 on opposite sides of the same pole. FIG. 9A illustrates utilization of two straps 30 for each enclosure box 10. Essentially, a first receiving bracket 20A could be attached to one side of a pole by two cinching straps, as described with regard to the embodiment of FIG. 3A. Thereafter, a second bracket 20B could be cinched by its own two straps 30 to an opposite side of the pole. To facilitate this, brackets 20 could include a slight indentation slightly larger than the width of a strap 30 along the edges 25 and 27 of the bracket. Such an indentation 80 is shown in FIGS. 4A and 5A. This would allow a strap 30 to be threaded through a bracket 20 that has already been installed and cinched to a side of pole 2 such that a second enclosure box 10 could be installed back-to-back at approximately the same vertical level as the first box 10. As illustrated in FIG.

9A, however, one box 10 and bracket 20 would have to be slightly higher than the other box 10 and bracket 20.

In the alternative, FIG. 9B shows that just two straps 30 could be used to mount two boxes 10 and two bracket 20 by threading the same strap 30 through slots at the top of brackets 20A and 20B, and a second strap 30B through slots in the bottom of brackets 20A and 20B.

FIGS. 10A–10C illustrate that, similarly, the mounting structure of FIG. 5A, with cross arms 60, could be used to mount back-to-back boxes 10 in a similar manner. FIG. 10A shows each box/bracket combination 10/20 utilizing its own set of two straps 30. The indents 80 along brackets 20 could be used. FIG. 10B shows use of substantially shorter straps 30, but threaded rods and end connectors on both ends of each strap, and a pair of straps between top cross arms 60 for each bracket 20 and bottom cross arms 60 for each bracket.

FIG. 10C shows an alternative embodiment where, instead of straps, rigid threaded rods 82 could be used between adjacent ends of cross arms 60 of each bracket 20 to cinch both brackets 20 to opposite sides of pole 2.

FIG. 11 shows optional features that could be used in any enclosure box. For example, ballasts 378 are removably mounted on ballast bracket 380. Fusing is removably mounted on a fuse bracket. Capacitors 382 are removably mounted on a capacitor bracket. Examples of these types of components and mounting methods and structure are disclosed in U.S. Pat. No. 5,600,537, which is incorporated by reference herein in its entirety.

Other components and structures are included. For example, wire guides 387 can be used to manage wiring inside box 10. Therefore, as mentioned previously, once the desired or needed components are mounted in box 10, its weight can be substantial.

FIGS. 12A–B show a C-hook and bracket arrangement for easy installation and removal of capacitors 382 from enclosure 10. This arrangement is similar to that disclosed at FIGS. 47 and 48 of U.S. Pat. No. 5,600,537. However, as illustrated diagrammatically at FIG. 12 herein, space inside box 10 can be at a premium. With more lights, or expanded features for lights, larger or more components may be needed to be put in generally the same size box 10. One example is as follows. Musco Corporation has a feature called MultiWatt™ that is disclosed in U.S. Pat. No. 4,994,718, incorporated by reference herein. It allows HID light fixtures to be dimmed by selection between different capacitances. Therefore, to add this feature, at least two capacitors are needed (e.g. one 30 microfarad, the other 60 microfarad), where normally only one is needed. U.S. Pat. No. 5,600,537, incorporated by reference herein, illustrates a capacitor mounting system (see particularly FIGS. 47 and 48), where a book bracket can be welded to the interior of the ballast box and a channel bracket with a bar across it can have mounted on it one or more capacitors. The channel bracket and its attached capacitors can be quickly inserted into a mounted position inside box 10.

As shown in FIGS. 12A–D, the hanger or hook bracket 422 consists of a base 423 that is weldable (see welds 421 in FIG. 12B) to the inside of box 10 at a desired position. Hook bracket 422 has an outwardly extending portion 436 that is bifurcated by a slot 425. This essentially creates 2 distal ends 424/426.

The channel bracket 430 is adopted to receive bolts 383 that extend through bracket 430 and adopted to work with further brackets to removably secure capacitors 382 to channel bracket 430. As can be seen at FIGS. 12E–G, special clamps hold the capacitor 382 to channel bracket 430 and are secured by tightening nuts on the ends of bolts 383 on the opposite side of channel bracket 430 from the capacitor 382.

A carriage bolt 432 extends across channel bracket 430. A indicated in FIGS. 12E–H, a spring lock washer can be inserted between the outside of channel bracket 430 and a nut 433 to hold carriage bolt 432 in place in bracket 430.

As indicated at FIG. 12B, when one or more capacitor 382 are secured to channel bracket 430, it is mounted to box 10 by simply moving carriage bolt 432 over hook bracket 422 and then seating it in place (see FIGS. 12 and 12B). Slot 425 leaves space for passage of any bolt 383 in the back of channel bracket 430 (see FIG. 12B).

The system allows great flexibility and the number of ballasts that can be used per hook bracket 422. Different lighting systems need different numbers of capacitors and types of capacitors. This allows removal of capacitors 382 from channel brackets 430 and sizing of the brackets 430 for the appropriate number of capacitors. As can be appreciated by reviewing FIG. 16, different ballast box arrangements require different numbers and configurations of capacitors. Space is at a premium in boxes 10. Therefore, allowing single hook brackets 422 to accommodate different numbers of capacitors allows flexibility in designing the contents of the ballast boxes, including flexibility in advantage of greater standardization or less different configurations for fabricating the basic ballast boxes for economy and production.

FIGS. 12E–12H show a single capacitor attachable to a rather short in length channel bracket 430. Bolts 383 and clamps 385 allow for easy replacement and interchangeability of capacitor 382 (to replace it, or to interchange different sized capacitors, etc.). The size of channel bracket 430 is commensurate with a single capacitor.

On the other hand FIGS. 12I–12L illustrate a single channel bracket 430 (longer than the one of FIGS. 12E–H) accommodating two capacitors. Similar clamps 385 are used on opposite ends of the configuration, but a smaller clamp 387 with a bolt 383 is used in the middle between the two capacitors 382A and 382B. Again the length of channel bracket 430 is commensurate with the size of the two mounted capacitors.

FIGS. 12M–12P show three capacitors 382A–C on a single but longer channel bracket 430.

This can be appreciated, when carriage bolt 432 is seated into bracket 422, nut 433 can be tightened. This pulls the opposite legs or walls of channel bracket 430 together which locks channel bracket 430 into hook bracket 422.

FIG. 16 illustrates, in chart/diagrammatic form, a system whereby a plurality of enclosures 10 can be used with essentially the same pole mounting structure. As can be seen, different sized enclosures 10 are configured to hold different numbers and different types of internal components. For example, some enclosures hold only two ballasts and two capacitors. Others hold four, or even six, ballasts and capacitors. Some additionally include circuit boards available for mounting microelectronics or other components.

It can further be seen in FIG. 16 how the basic width of each of the enclosures is similar, if not identical, and that a majority utilize bracket 18 as the mechanism for hanging the enclosure 10 on a bracket 20. Of those ten enclosures using bracket 18, there are three different lengths of enclosures. Therefore, at most three different lengths of bracket 20 are required for ten different sized enclosures. Seven out of the ten utilize an opening 52 for use with a mechanical hub 50 for securing the lower end of the box 10 to bracket 20.

The remaining four enclosures need bracket 20S for attachment. These four boxes 10 are stackable on top of any of the other 7 boxes 10 and would utilize bracket 20S. The other 7 with hub holes will need bracket 20L. Bracket 20L length is dependent on box 10 length but bracket 20S length is preferably approximately 10 inches. However, as illustrated, instead of each enclosure 10 having multiple mounting structures, with multiple welding and assembly configurations, a substantial majority utilize the same hanger bracket 18 in the same position relative to each enclosure box 10. This substantially reduces the number of weldments and other manufacturing steps to facilitate a mounting method for these enclosures. And then, a relatively standardized mounting bracket 20 can be utilized for each of those enclosures, with mounting straps 30 being available to be cut to required size (either at the manufacturing facility or on-site).

What is claimed is:

1. An apparatus for mounting enclosure boxes along a pole comprising:
   a hanger bracket having a pole side and an outer facing side on opposite sides of an axis;
   a cinching member adapted to connect to or abut the hanger bracket and surround a pole and cinch the hanger bracket to a pole;
   an adjustment mechanism adapted to adjust the amount of cinching pressure of the cinching member between the hanger bracket and a pole;
   a connection on the hanger bracket adapted to receive, support, and retain an enclosure box independent of cinching the hanger bracket along a pole, the connection comprising a slot having an entrance opening and a terminal end adapted to receive through the entrance opening a pin mounted on an enclosure box and retain it at the terminal end against downward or lateral movement, but allows removability of the pin by reverse movement.

2. The apparatus of claim 1 in combination with an enclosure box having a hanger bracket adapted to cooperate with the bracket cinched to the pole.

3. The apparatus of claim 1 wherein the enclosure box is adapted to hold electrical components.

4. The apparatus of claim 3 wherein the enclosure box is adapted to include electrical components related to operation of high intensity lights.

5. The apparatus of claim 4 wherein the electrical components comprise one of more of a ballast, contactor, switch, or fuse.

6. The apparatus of claim 1 wherein the hanger bracket comprises a U-shaped channel member having the outer facing side comprising a plate and two parallel plates extending from the outer facing side terminating in distal edges.

7. The apparatus of claim 6 wherein the channel member is elongated between opposite ends.

8. The apparatus of claim 7 wherein the elongated length is adapted to be less than the length of an enclosure box it is adapted to receive.

9. The apparatus of claim 1 wherein the cinching member comprises a strap.

10. The apparatus of claim 9 wherein the hanger bracket includes an opening through which the strap can pass.

11. The apparatus of claim 9 wherein the adjustment mechanism comprises an elongated threaded member and a nut adjustable along the threaded member.

12. The apparatus of claim 11 wherein the adjustment mechanism comprises a second bracket to which said threaded members are insertable.

13. The apparatus of claim 11 wherein the adjustment mechanism comprises a threaded bolt and complementary nut, and the hanger bracket comprises a cross arm with openings adapted to receive the threaded bolt.

14. The apparatus of claim 1 wherein the hanger bracket further comprises a cross member terminating in opposite ends and including connections for a cinching member.

15. The apparatus of claim 14 further comprising a pair of cross members.

16. The apparatus of claim 14 wherein a cinching member exists for each cross member.

17. The apparatus of claim 1 further comprising a hub block on the hanger bracket, the hub block having a perimeter shape adapted for mating insertion into a complimentary opening in an enclosure box to assist in alignment and support of the enclosure box on a hanger bracket.

18. The apparatus of claim 17 wherein the hub block is removably connected to the receiver bracket.

19. The apparatus of claim 18 wherein the hub block further comprises an attachment mechanism for an enclosure box.

20. The apparatus of claim 19 wherein the attachment mechanism comprises a self-captured screw threadably receivable in the hub block.

21. The apparatus of claim 1 wherein the cinching member comprises a strap having opposite ends.

22. The apparatus of claim 21 further comprising end members on the opposite ends of the strap, the end members including a mechanism to adjustably connect to another member.

23. The apparatus of claim 1 wherein the cinching mechanism comprises a second bracket adapted to connect to an end member of the strap.

24. The apparatus of claim 23 wherein the second bracket has a pole-facing side with at least one free edge having an indentation for encouraging self centering of the second bracket on the exterior of a pole.

25. The apparatus of claim 23 wherein said second bracket includes a connection member which is pivotable relative to the second bracket.

26. The apparatus of claim 25 wherein the connection member comprises a U-shaped member.

27. A method of attaching an enclosure box along a pole comprising:
   cinching a receiver bracket along the length of a pole;
   independently hanging an enclosure box to a previously cinched receiver bracket by receiving a pin mounted on the enclosure box into a slot having an entrance and a terminal end in the receiver bracket and the slot and the terminal end holding the pin against further downward or lateral movement, but allowing removal of the pin by reverse movement.

28. The method of claim 27 further comprising fixing the enclosure to the receiver bracket against certain movement.

29. The method of claim 28 wherein the step of fixing against certain movement comprises attaching a portion of the enclosure to the receiver bracket or pole in a manner that prohibits separation of the enclosure box or longitudinal movement of the enclosure box.

30. The method of claim 27 further comprising stacking a plurality of enclosure boxes one above the other on receiver brackets previously cinched to the pole.

31. An apparatus for mounting enclosure boxes along a pole comprising:

a hanger bracket having a pole side and an outer facing side on opposite sides of an axis;

a cinching member adapted to connect to or abut the hanger bracket and surround a pole and cinch the hanger bracket to a pole, the cinching member comprising a strap;

an adjustment mechanism adapted to adjust the amount of cinching pressure of the cinching member between the hanger bracket and a pole, the adjustment mechanism comprising an elongated threaded member and a nut adjustable along the threaded member and a second bracket to which said threaded members are insertable;

a connection on the hanger bracket adapted to receive, support, and retain an enclosure box independent of cinching the hanger bracket along a pole.

32. An apparatus for mounting enclosure boxes along a pole comprising:

a hanger bracket having a pole side and an outer facing side on opposite sides of an axis;

a cinching member adapted to connect to or abut the hanger bracket and surround a pole and cinch the hanger bracket to a pole the cinching mechanism comprising a second bracket adapted to connect to an end member of the strap, the second bracket having a pole-facing side with at least one free edge having an indentation for encouraging self centering of the second bracket on the exterior of a pole;

an adjustment mechanism adapted to adjust the amount of cinching pressure of the cinching member between the hanger bracket and a pole;

a connection on the hanger bracket adapted to receive, support, and retain an enclosure box independent of cinching the hanger bracket along a pole.

33. An apparatus for mounting enclosure boxes along a pole comprising:

a hanger bracket having a pole side and an outer facing side on opposite sides of an axis;

a cinching member adapted to connect to or abut the hanger bracket and surround a pole and cinch the hanger bracket to a pole the cinching mechanism comprising a second bracket adapted to connect to an end member of the strap, the second bracket including a connection member which is pivotable relative to the second bracket;

an adjustment mechanism adapted to adjust the amount of cinching pressure of the cinching member between the hanger bracket and a pole;

a connection on the hanger bracket adapted to receive, support, and retain an enclosure box independent of cinching the hanger bracket along a pole.

34. The apparatus of claim 33 wherein the connection member comprises a U-shaped member.

* * * * *